United States Patent
Hong et al.

(10) Patent No.: US 10,298,450 B2
(45) Date of Patent: May 21, 2019

(54) CONSISTENT HASHING FOR NETWORK TRAFFIC DISPATCHING

(71) Applicant: Nicira, Inc., Palo Alto, CA (US)

(72) Inventors: Xinhua Hong, Milpitas, CA (US); Jayant Jain, Palo Alto, CA (US); Mohan Parthasarathy, Cupertino, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/916,243

(22) Filed: Mar. 8, 2018

(65) Prior Publication Data

US 2018/0198679 A1    Jul. 12, 2018

Related U.S. Application Data

(63) Continuation of application No. 14/295,302, filed on Jun. 3, 2014, now Pat. No. 9,917,727.

(51) Int. Cl.
*H04L 12/24* (2006.01)
*H04L 29/08* (2006.01)
*H04L 12/743* (2013.01)

(52) U.S. Cl.
CPC ...... *H04L 41/0806* (2013.01); *H04L 67/1002* (2013.01); *H04L 67/1023* (2013.01); *H04L 45/7453* (2013.01)

(58) Field of Classification Search
CPC ....... G06F 15/173; G06F 9/505; H04L 67/10; H04L 67/02; H04L 69/22; H04L 69/163; H04L 29/06; H04L 29/12
See application file for complete search history.

(56) References Cited

U.S. PATENT DOCUMENTS

| | | | |
|---|---|---|---|
| 7,369,557 B1 | 5/2008 | Sinha | |
| 7,672,236 B1 | 3/2010 | Karunakaran et al. | |
| 7,877,515 B2 | 1/2011 | Andersson et al. | |
| 9,264,313 B1 | 2/2016 | Manuguri et al. | |
| 9,917,727 B2 | 3/2018 | Hong et al. | |
| 2005/0055435 A1 | 3/2005 | Gbadegesin et al. | |
| 2005/0223102 A1 | 10/2005 | Zhang et al. | |
| 2005/0249199 A1 | 11/2005 | Albert et al. | |
| 2006/0233106 A1 | 10/2006 | Achlioptas et al. | |
| 2008/0256094 A1 | 10/2008 | Gupta et al. | |
| 2010/0149966 A1 | 6/2010 | Achlioptas et al. | |
| 2010/0235495 A1 | 9/2010 | Petersen et al. | |
| 2010/0268935 A1 | 10/2010 | Rodgers et al. | |

(Continued)

*Primary Examiner* — Jae Y Lee
*Assistant Examiner* — Aixa A Guadalupe Cruz
(74) *Attorney, Agent, or Firm* — Adeli LLP

(57) ABSTRACT

A method is provided that uses a consistent hashing technique to dispatch incoming packets in a stable system prior to adding of a node. The method uses a hash table and assigns hash buckets in the table to each network node. A set of fields in each incoming packet is hashed and is used to identify the corresponding hash bucket. The packets are then dispatched to the network nodes based on the nodes' hash buckets. During an observation period, the method identifies the ongoing sessions by creating a bit vector table that is used to identify the old and new sessions during a re-dispatching period. The method uses the consistent hashing method and the probabilistic method dispatch the incoming packets such that each packet that belongs to an old session is dispatched to the same old node that has been processing the other packets of the session.

22 Claims, 18 Drawing Sheets

(56) References Cited

U.S. PATENT DOCUMENTS

| | | |
|---|---|---|
| 2011/0069632 A1 | 3/2011 | Chen et al. |
| 2011/0258199 A1 | 10/2011 | Oliver et al. |
| 2012/0155266 A1 | 6/2012 | Patel et al. |
| 2013/0265875 A1 | 10/2013 | Dyke et al. |
| 2014/0059544 A1 | 2/2014 | Koganty et al. |
| 2015/0003453 A1 | 1/2015 | Sengupta et al. |

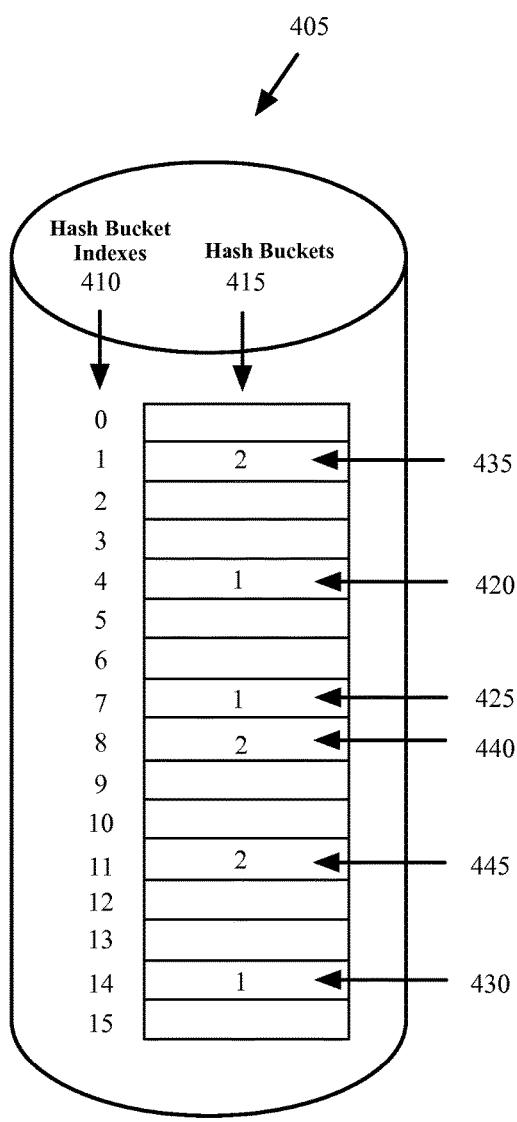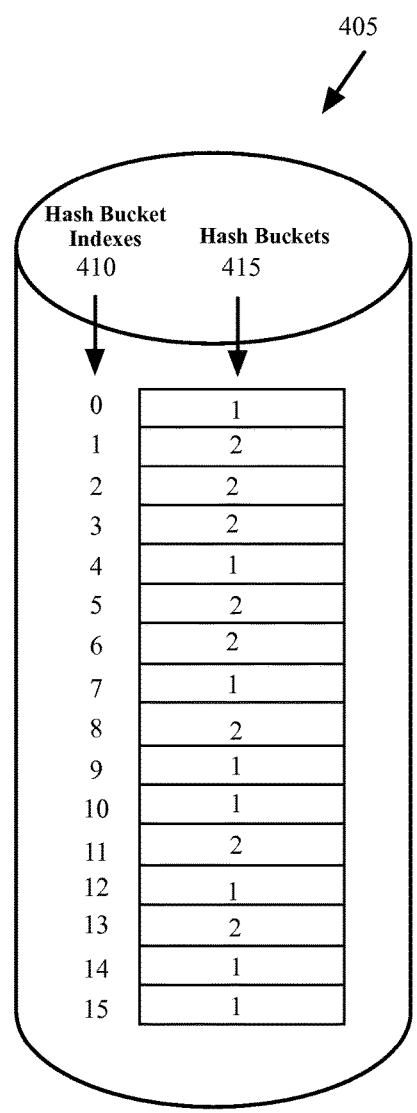
Fig. 4
Fig. 6

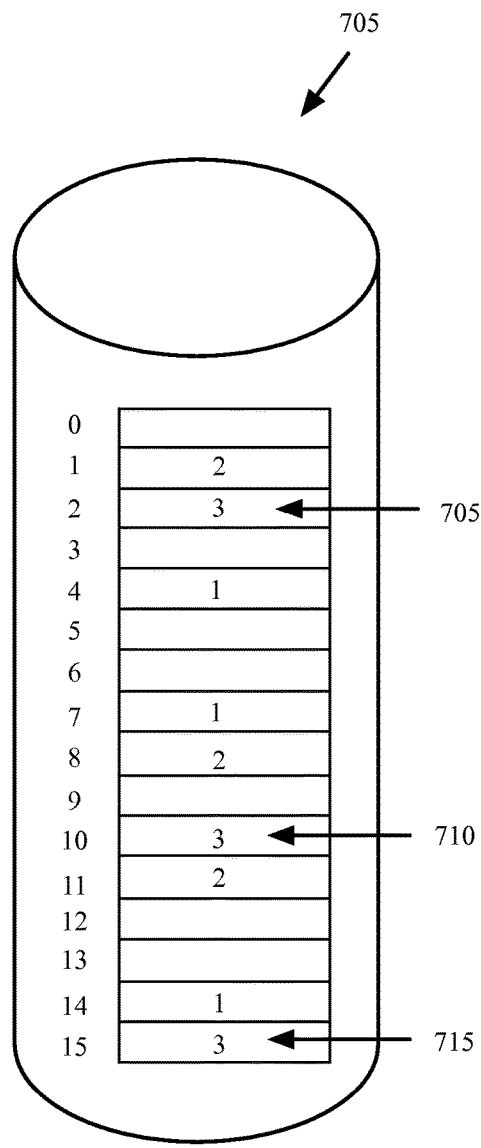 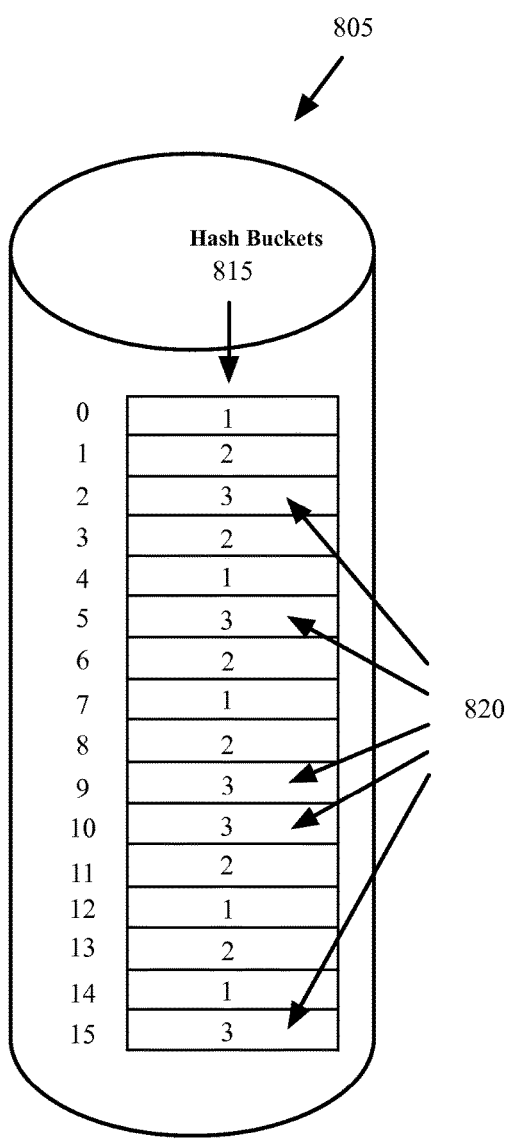
*Fig. 7*          *Fig. 8*

CONSISTENT HASHING FOR NETWORK TRAFFIC DISPATCHING

CLAIM OF BENEFIT TO PRIOR APPLICATION

This application is a continuation application of U.S. patent application Ser. No. 14/295,302, filed Jun. 3, 2014, and now published as U.S. Patent Publication 2015/0350087. U.S. patent application Ser. No. 14/295,302, now published as U.S. Patent Publication 2015/0350087 is incorporated herein by reference.

BACKGROUND

Workload of a network has to be evenly distributed across multiple network resources (or network nodes) in order to optimize the resource use and throughput and avoid overloading any of the network nodes. In a network with numerous nodes, there may be hundreds or thousands of active sessions at a time. Load balancing and traffic dispatching for these networks require ensuring that incoming packets for an ongoing session are forwarded to the same node that has been processing the session's previous packets.

In addition, scaling events require traffic stickiness to ensure that packets for ongoing sessions are still dispatched to the same nodes that were processing the sessions prior to the scaling event. For instance, adding a network node requires ensuring that packets belonging to sessions that existed prior to adding the network node are dispatched to the same nodes that were processing the existing sessions. Similarly, scheduled removal of a network node requires stopping the dispatch of packets for new sessions to the node and ensuring that all ongoing sessions processed by the node are over prior to removing of the node.

In a network with hundreds or thousands of ongoing sessions, a stateful system or appliance (such as stateful load-balancer) is not able to support scale-out traffic dispatching due to the system resource limitation, such as the amount of memory required for storing stateful information. The pure hashing algorithms can support large amount of scale-out nodes, but do not support traffic stickiness well.

BRIEF SUMMARY

Some embodiments provide a hybrid method of using stateless and stateful techniques to provide scale-out network traffic dispatching. The method uses a consistent hashing table algorithm to load balance traffic. The method utilizes a Bloom filter bit vector table to determine old traffic and new traffic when a network node is added or removed. The method uses a connection tracking table to handle possible false positive cases that the Bloom filter algorithm creates.

Some embodiments provide a method that uses a consistent hashing technique to load balance and dispatch incoming packets in a stable system prior to adding or removing of a node. The consistent hashing technique uses a hash table and assigns the entries (or hash buckets) in the table to each network node. A set of fields in each incoming packet is hashed and the hash value is used to identify a hash bucket in the hash table. The packets are then dispatched to the network nodes based on the nodes' corresponding hash buckets. The method then starts a configurable observation period before the node is added or removed.

During the observation period, the method identifies the ongoing sessions by using a probabilistic method. Some embodiments utilize a bit vector table, or Bloom filter, to identify the old and new sessions. Several hash functions are used to calculate the hash of a set of fields (an n tuple) of each incoming packet. The hash values are used to statistically identify the existing sessions (sessions that started before the start of the observation period) as well as the sessions that start during the observation period.

After the end of the observation period, the method starts a configurable re-dispatching period. During the re-dispatching period, the method adds the new node and generates a new hash table that assigns a set of the hash buckets to the new node. The method uses the consistent hashing method and the probabilistic method to ensure that no packet that belongs to an old session is dispatched to the new node. During the re-dispatching period, the method dispatches the incoming packets such that each packet that belongs to an old session is dispatched to the same old node that has been processing the other packets of the session. After the end of the re-dispatching period, the method dispatches the incoming packets to the new node and the old nodes according to the consistent hashing method.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 4 conceptually illustrates a hash table in some embodiments of the invention.

FIG. 6 shows the hash table of FIG. 4 after the hash table is filled and the hash buckets are filled with node IDs.

FIG. 7 illustrates another example for generating primary entries for a hash table in some embodiments of the invention when the number of nodes is 3 and the number of seeds is also 3.

FIG. 8 shows the hash table in the example of FIG. 7 after all the rest of the hash buckets are filled with the node IDs.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of dispatching the incoming packets in a network with a large number (e.g., hundreds or thousands) of nodes. The method provides traffic stickiness after scaling the network. Scaling of the network refers to adding or gracefully removing a node. Traffic stickiness refers to the ability to dispatch the incoming packets that belong to an existing session to the same node that has been receiving the other packets of the same session.

Some embodiments provide a hybrid method of using stateless and stateful techniques to provide network traffic dispatching after a scaling event to add or remove a node. The stateless techniques are used to dispatch a majority of the incoming packets after the scaling event. A small percentage of the packets that may belong to the sessions that were ongoing before the scaling event, are further examined by stateful techniques that require more storage and/or computing resources than the stateless techniques.

Figure 1:
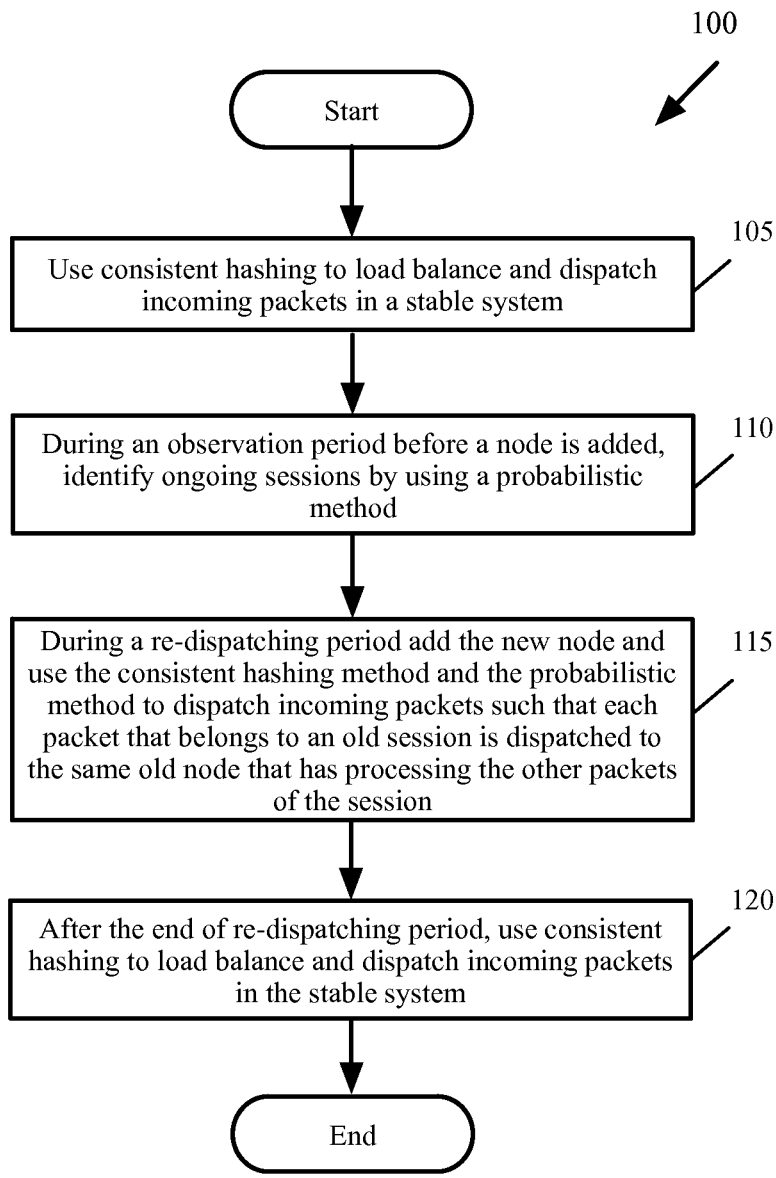
FIG. 1 conceptually illustrates a high-level process for dispatching incoming packets in some embodiments of the invention when a network is scaled-out to add a new node.

FIG. 1 conceptually illustrates a high-level process 100 for dispatching incoming packets in some embodiments of the invention when a network is scaled-out to add a new node. Process 100 is described by referencing FIGS. 2A-2D. FIGS. 2A-2D show dispatching of incoming packets in four stages 201-204 when a new node is added to a network in some embodiments of the invention.

As shown in FIG. 1, the process uses (at 105) a consistent hashing technique to load balance and dispatch incoming packets in a stable system prior to adding of the node. As described further below, the consistent hashing technique uses a hash table and assigns the entries (or hash buckets) in the table to each network node. A set of fields in each incoming packet is hashed and the hash value is used to identify the corresponding hash bucket in the hash table. The packets are then dispatched to the network nodes based on the nodes' hash buckets.

Figure 2A:
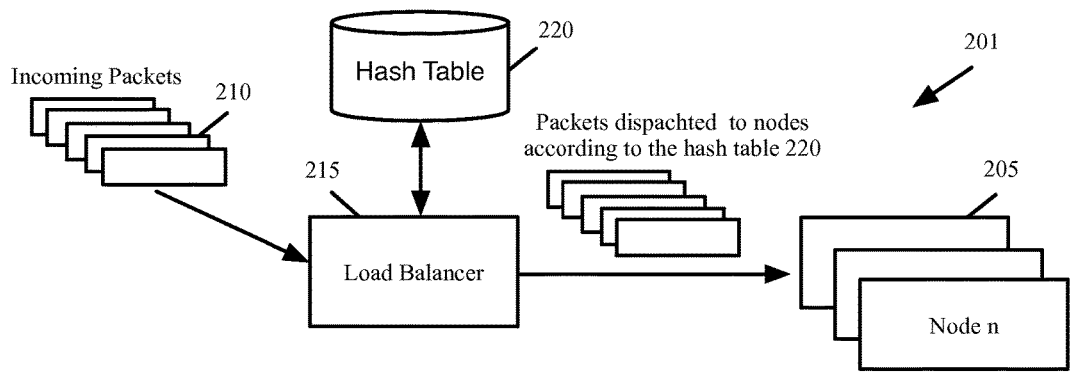
FIG. 2A conceptually illustrates a network prior to adding of a new node in some embodiments of the invention.

FIG. 2A conceptually illustrates the network in stage 201 prior to adding of a new node. As shown, the network includes several nodes 205. A load balancer 215 receives incoming packets 210 and dispatches the packets to the network nodes 205 according to a hash table 220.

In some embodiments, the network nodes 205 are computing resources and the load balancer balances the incoming packets among the nodes. In other embodiments, the network nodes 205 are also load balancers or firewalls and the load balancer acts as a load balancer of the load balancers. In some of these embodiments, the load balancer 215 is one of the nodes 205, which is dynamically selected to receive the incoming packets and distribute it among itself and the other nodes. For instance, the network nodes in some embodiments are software implemented virtual machines that form a logical network and the load balancer is one of the nodes and provides an entry point for the logical network. As shown, the load balancer dispatches the packets to the network nodes according to the hash table. If the load balancer is one of the nodes and processes the packets to provide other services, the packets that are assigned to the load balancer according to the hash table 220 are processed at the load balancer instead of being dispatched to other nodes.

Referring back to FIG. 1, the process then starts a configurable observation period before a new node is added to the network. During the observation period, the process identifies (at 110) the ongoing sessions by using a probabilistic method. Some embodiments utilize a bit vector map (or a Bloom filter). This bit vector table is generated during the observation period and is used during a subsequent re-dispatching period to identify the old and new sessions.

During the observation period, several hash functions (referred hereinafter as Bloom filter hash functions) are used to calculate the hash of a set of fields (or an n tuple) in each incoming packet. The hash values are used to statistically identify the existing sessions (sessions that started before the start of the observation period) as well as the sessions that start during the observation period. The bit vector table entries are initially set to '0'. Each hash value results in a corresponding entry in the bit vector table to be set to "1".

Figure 2B:
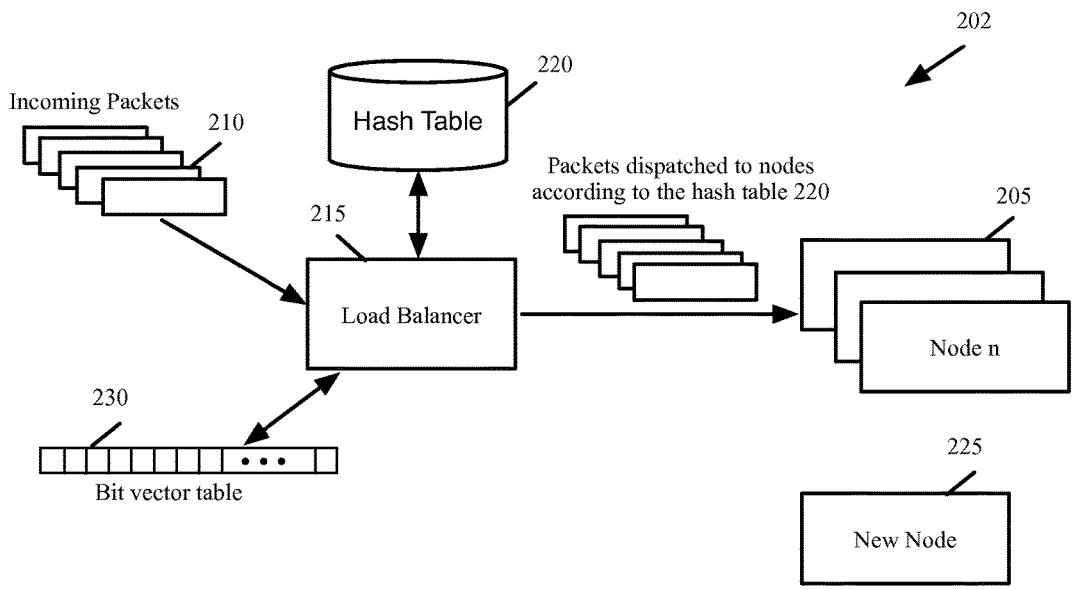
FIG. 2B conceptually illustrates the network during the observation period.

FIG. 2B conceptually illustrates the network in stage 202 during the observation period. As shown, a data structure 230 is used during the observation period to identify the sessions that are ongoing during this period. Some embodiments utilize a bit vector table to statistically identify the communication sessions that are active during the observation period. A set of hash functions As shown, the new node 225 does not receive any packets during this period and the incoming packets 210 are still dispatched according to the hash table 220 to the old nodes 205.

Referring back to FIG. 1, the process then starts a configurable re-dispatching period. During the re-dispatching period, the process adds the new node and generates a new hash table that assigns a set of the hash buckets to the new node. The process uses the consistent hashing method and the probabilistic method to ensure that no packet that belongs to an old session is dispatched to the new node. During the re-dispatching period, the process dispatches (at 115) incoming packets such that each packet that belongs to an old session is dispatched to the same old node that has been processing the other packets of the session.

Figure 2C:
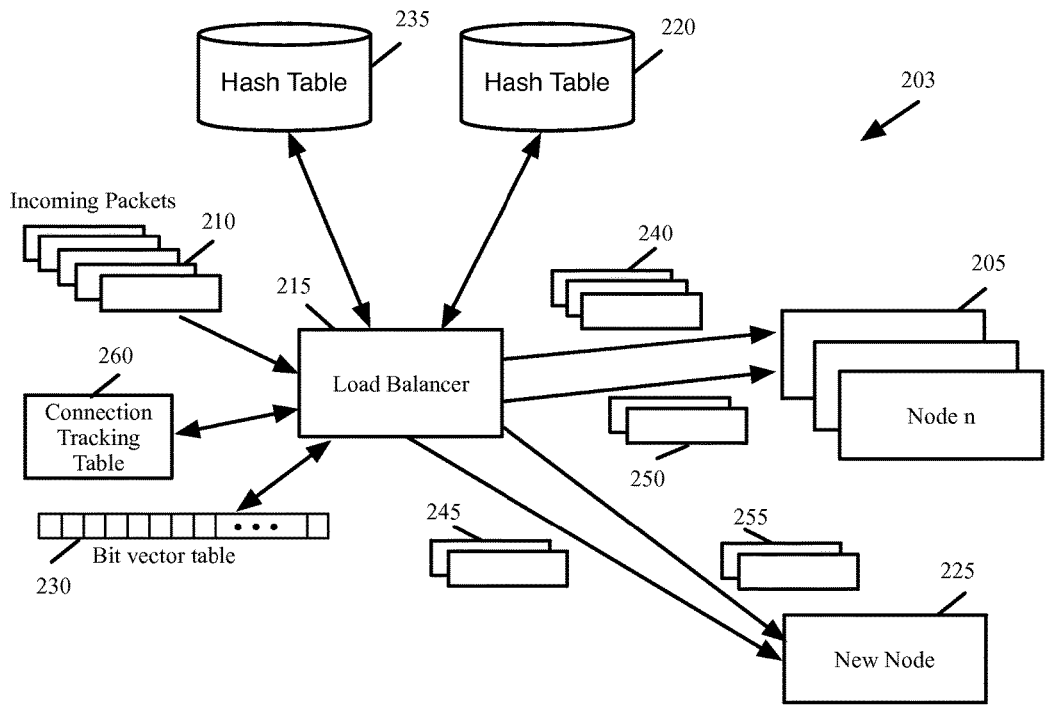
FIG. 2C conceptually illustrates the network during the re-dispatching period.

FIG. 2C conceptually illustrates the network in stage 203 during the re-dispatching period. As shown, the load balancer 215 has generated a new hash table 235 that assigns a set of the hash buckets to the new node. The load balancer hashes the same set of fields of the incoming packets as in stages 201 and 202. Packets 240 that are assigned according to the new hash table 235 to the old nodes are dispatched to the old nodes.

As described below by reference to FIG. 8, consistent hashing technique generates hash table 235 in a way that the hash buckets that are not assigned to the new node are assigned to the same nodes as in table 220. In this way, consistent hashing technique ensures that the packets that are assigned to the old nodes by hash table 235 can be dispatched to the assigned nodes without further examination. In other words, whether or not these packets belong to an old or a new session, the packets are dispatched to the same nodes according to the new hash table as would have been assigned according to the old hash table.

Any packet that is assigned to the new node according to the new hash table 235 is further examined to determine whether or not the packet belongs to an old session. The n tuple of the packets that are assigned to the new node are hashed by the same set of Bloom filter hash functions that were used in stage 202. The hash values are then compared with the entries in the bit map vector. As described further below, when any of the hash values corresponds to a bit vector table entry that is '0', the packet definitely does not belong to an old session. These packets 245 are dispatched to the new node.

On the other hand, when all hash values of a packet match bit vector map entries of '1', the packet may (not must) belong to an old session. These packets are further examined by a stateful connection tracking method. The connection tracking method uses a connection tracking table 260 to deterministically identify the packets 250 that belong to the old sessions. These packets 250 are dispatched to the old nodes 205 according to the hash table 220 that existed before the re-dispatching period. The packets 255 that are identified by the connection tracking method as belonging to the new sessions or to sessions that started during the re-dispatching period are dispatched to the new node.

After the end of the re-dispatching period, process 100 dispatches (at 120) the incoming packets to the new node and the old nodes according to the consistent hashing method. The process then ends.

Figure 2D:
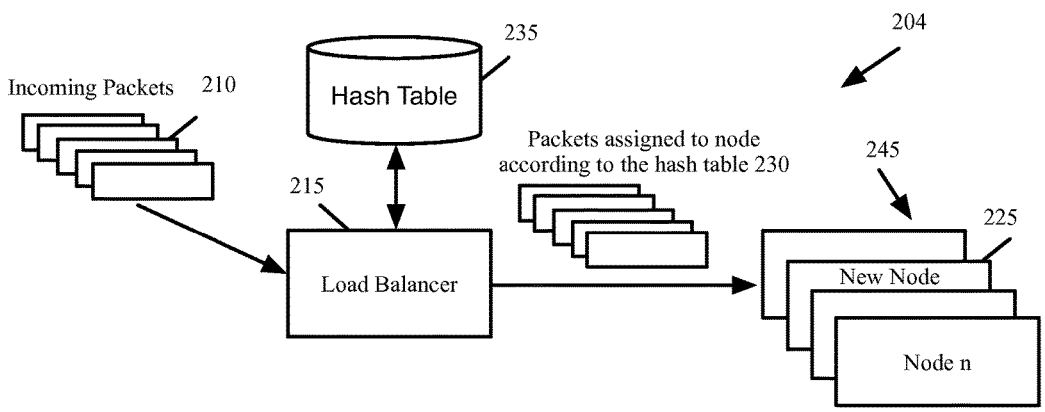
FIG. 2D conceptually illustrates the network after the end of the re-dispatching period.

FIG. 2D conceptually illustrates the network in stage 204 after the end of the re-dispatching period. As shown, the load balancer 215 has discarded the information in the old hash table 220, the bit vector table 230, and the connection tracking table 260. The load balancer is dispatching the incoming packets 210 as determined by the new hash table 235 to the new set of nodes 245 (which includes the old nodes 205 as well as the new node 225).

Figure 3:
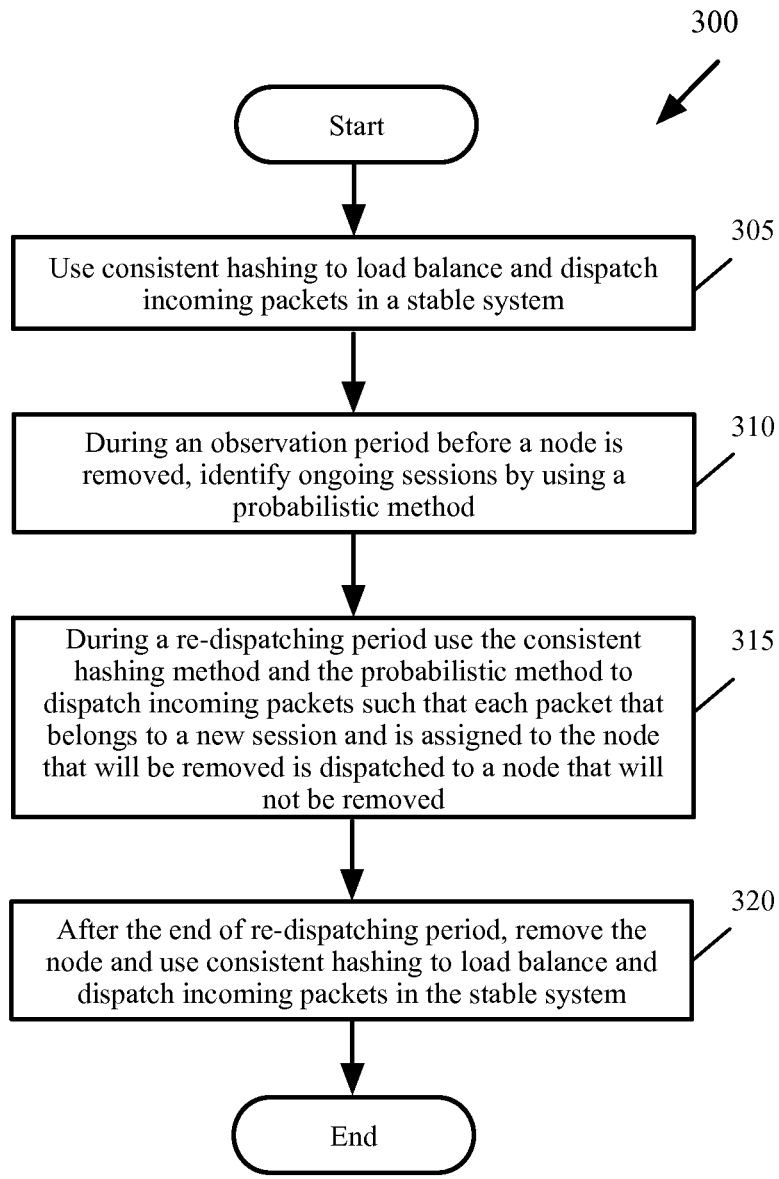
FIG. 3 conceptually illustrates a high-level process for dispatching incoming packets in some embodiments of the invention when a node is gracefully removed from the network.

FIG. 3 conceptually illustrates a high-level process 300 for dispatching incoming packets in some embodiments of the invention when a node is gracefully removed from the network. As shown, the process uses (at 305) a consistent hashing technique to load balance and dispatch incoming packets in a stable system prior to adding of the node. The consistent hashing technique uses a hash table and assigns the entries, or hash buckets, in the table to each network node. A set of fields, or n tuple, in each incoming packet is hashed and the hash value is used to identify the corresponding hash bucket in the hash table. The packets are then dispatched to the network nodes based on the nodes' hash buckets.

The process then starts a configurable observation period before the node is removed from the network. During the observation period, the process identifies (at 310) the ongoing sessions by using a probabilistic method as described by reference to process 100, above.

The process then starts a configurable re-dispatching period. During the re-dispatching period, the process generates a new hash table that does not assign the node that is being removed to any hash buckets. The process uses the consistent hashing method and the probabilistic method to dispatch (at 315) any packets that belong to a new session and is assigned to the node that is being removed to another node. By doing this, the process ensures that no new sessions are dispatched to the node that is being removed. Some embodiments continue the re-dispatching period until the rate of the incoming packets that belong to the existing sessions and are processed by the node that is going to be removed falls below a threshold. For instance, the re-dispatching period is extended until the rate becomes statistically insignificant or becomes 0 (e.g., n minutes passes without receiving such packets, where n is a configurable value).

After the end of the re-dispatching period, the process removes the node and dispatches (at 320) the incoming packets to the remaining nodes according to the new hash table. The process then ends.

Several more embodiments are described below. Section I describes the details of the consistent hashing method. Next, Section II describes the observation period during which the ongoing sessions are identified. The re-dispatching period is described in Section III. Finally, Section IV describes an electronic system that is used to implement some embodiments of the invention.

I. Consistent Hashing

Some embodiments provide a novel consistent-hashing algorithm to load-balance the traffic in a stable system. The algorithm assigns the packets to "buckets" based on the hash of a set of fields of the packets. The buckets are evenly distributed among the existing nodes of the network. When a new node is added or removed, the consistent-hashing algorithm adjusts the buckets to distribute them among the new set of nodes. Adding a new node to a 200 nodes system results in only a 0.5% of the traffic to be redirected to the new node. Only this small percentage of the traffic needs to be further examined to make sure they don't belong to an old session.

Some embodiments utilize a hash table for dispatching network traffic. In some of these embodiments, a hash function (such as MD5 message-digest algorithm) and a number of seeds are used to generate the primary entries for the table. FIG. 4 conceptually illustrates a hash table 405 in some embodiments of the invention. In this example, the size of the hash table is 16. The size of the hash table in other embodiments can be different. In some embodiments, the size of the hash table is configurable and is set to accommodate the maximum number of possible nodes for the network. In some of these embodiments, the size of the hash table is set once and is not changed when nodes are added or removed. As shown, the size of the table determines the number of hash buckets (or containers) 415.

In the example of FIG. 4, there are 16 hash buckets 415 as shown by hash bucket indexes 0-15 410. For each hash bucket index 410, table 405 includes an entry, or a hash bucket, 415 to store the corresponding network node identification (node ID). Although in the example of FIG. 4, the node IDs are shown as integer numbers starting at 1, the node IDs are not limited to integer numbers. For instance the node ID can be the media access control (MAC) address or any other identification of the node. Each primary entry assigns a network node to a hash bucket. For instance, the following snippet of code shows an example of generating the primary entries of the hash table when the network has two nodes, and the number of primary seeds is 3. In this example, the seed values (or seed IDs) are 1, 2, and 3; the node IDs are 1 and 2; the hash function used for consistent hashing is MD5; and % is the modulo operator which returns the remainder of the division of one number by another. MD5 message-digest algorithm is a mathematical algorithm that is used in some embodiments to provide the even distribution and consistency for assigning the hash table entries. Other embodiments utilize other algorithms to populate the hash table 405.

```
Loop nodeID (1, 2)
    Loop seedID (1, 2, 3)
        H = MD5 (nodeID + seedID)
        write nodeID to hash-bucket [H%16]
    END /* Loop of Seeds */
END /* Loop of Nodes */
```

Figure 5:
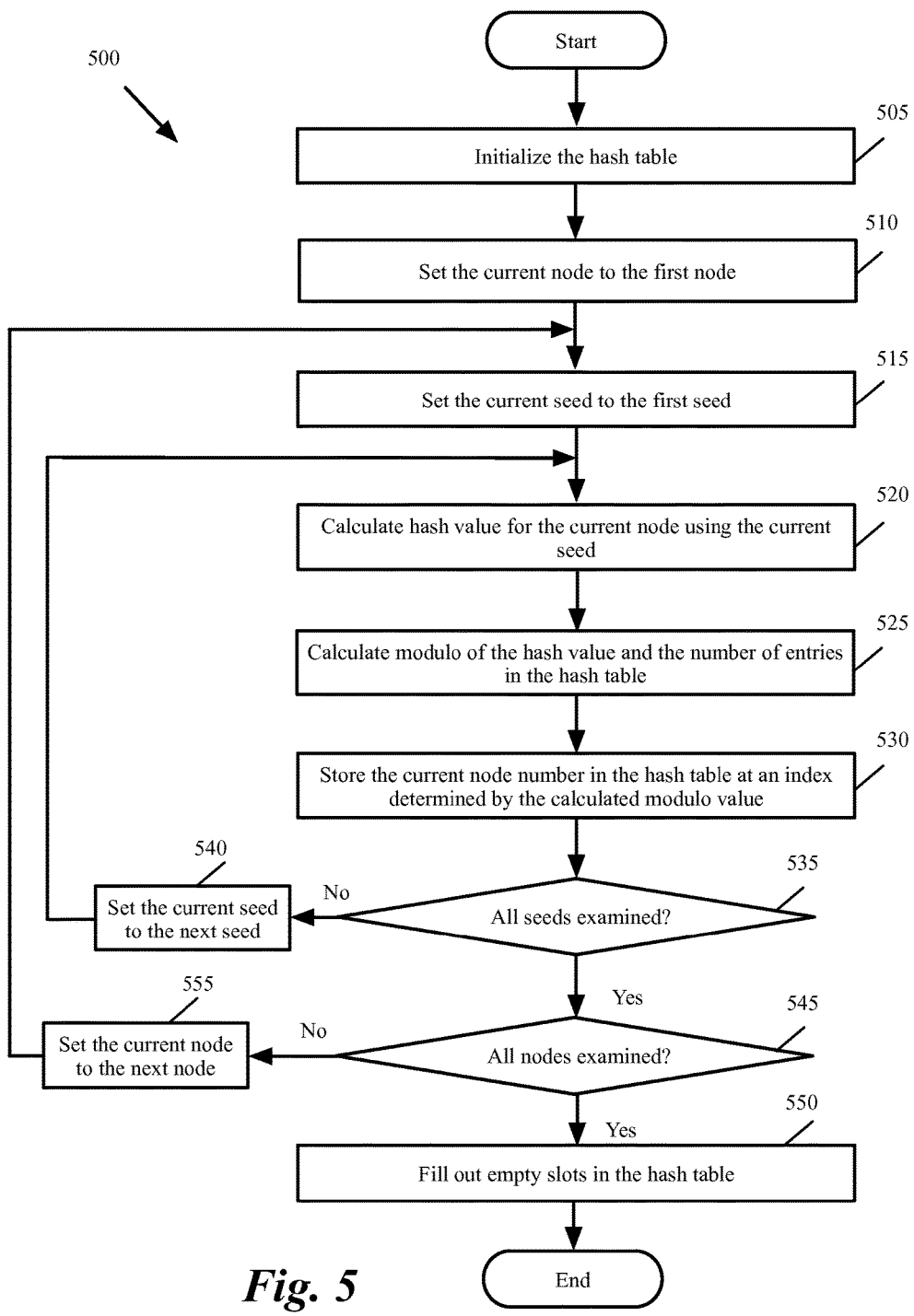
FIG. 5 conceptually illustrates a process for creating a hash table that is used for dispatching network traffic in some embodiments of the invention.

FIG. 5 conceptually illustrates a process 500 for creating a hash table that is used for dispatching network traffic in some embodiments of the invention. As shown, the process initializes (at 505) the hash table. The process then sets (at 510) the current node to the first node of the network. The process then sets (at 515) the current seed to the first seed.

Next, the process calculates (at 520) the hash value for the current node combined with the current seed (e.g., the hash value of the sum of the identifier of the current node and the identifier of the current seed). The process then calculates (at 525) modulo of the hash value and the number of entries in the hash table (i.e., the process divides the hash value to the number of entries in the hash table and uses the remainder of the division operation). The process then stores (at 530) the current node ID (or node number) in the hash table at an index determined by the calculated modulo value.

The process then determines (at 535) whether the combination of all seeds and the current node are examined. If not, the process sets (at 540) the current seed to the next seed. The process then proceeds to 520, which was described above.

Assuming that the modulo values calculated using the three seeds for the first node are 4, 7, and 14, FIG. 4 shows that the node ID of the first node is written in the hash table entries 420-430 that correspond to the calculated modulo values.

Referring back to FIG. 5, when all seeds for the current node are examined, the process determines (at 545) whether all nodes are examined. If not, the process sets (at 555) the current node to the next node. The process then proceeds to 515, which was described above. Assuming that the modulo values calculated using the three seeds for the second node are 1, 8, and 11, FIG. 4 shows that the node ID of the second node is written in the hash table entries 435-445 that correspond to the calculated modulo values.

Once the primary entries are generated, process 500 fills out the rest of empty slots in the hash table by dividing the rest of the empty slots among the nodes. The process then ends. Some embodiments select the size of the hash table and the number of primary entries to minimize the hash collisions for the primary entries. However, in case of a collision, a hash collision resolution strategy is used to resolve the collisions. For instance, in some embodiments the collided entries are placed next to each other (using a chaining technique) and the identifier of both nodes are used to fill the empty slots.

The following simplified pseudo code shows an example of generating the primary entries of the hash table and resolving possible collisions. In this example, NodeTbl is an array that holds the network node identifiers, Replica is the current hash seed, the operator << is bitwise shift left, and the operator || is bitwise OR.

```
CLEAR HashTbl /* Set all entries in the hash table to 0 */
/* Pick Replica value */
Replica Value := (sizeof (hash table) / (number of nodes * 5))
FOR i = 1 to Replica
    FOR j = 1 to Number of nodes
        /In a 64 bit word, copy the current value of Replica into the
            higher half of the word and the current value of node
            identifier in the lower half of the word */
        Hash_index := (MD5(i << 32 || NodeTbl[j])) MOD
            (sizeof(hash table))
        IF HashTbl[Hash_index] == 0 /* No hash collision */
            HashTbl[Hash_index] := NodeTbl[j]
        ELSE
            /* Hash collision, append this node to the next unoccupied
                hash slot */
            while HashTbl[Hash_index] != 0
                Hash_index++
            HashTbl[Hash_index] := NodeTbl[j]
        ENDIF
    ENDFOR
ENDFOR
```

Once the primary entries are entered in the hash table, the rest of the empty slots are filled. The following simplified pseudo code shows an example of filling the rest of the hash table. In this example, PreviousPrimarySlots is a vector that identifies the last primary slot (or slots) that was filled in the hash table. If there last primary entry was filled without a collision, the PreviousPrimarySlots[0] holds the node identifier for that primary slot. On the other hand, the there was a collision, PreviousPrimarySlots vector will contain the node identifier of the collided primary entries in sequence.

```
/* Roll back to fill the hash table starting with the first entry */
FOR i = 1 to Sizeof(hash table)
    IF HashTbl[i] != 0
        /* This is a primary slot. Update the PreviousPrimarySlots
            vector */
        PreviousPrimarySlots = HashTbl[i] /* Multiple slots when
            there is collision */
    ELSE
        HashTbl[i] = PreviousPrimarySlots /* Round robin fill all
            primary slots */
    ENDIF
```

As an example, if there were only two network node, a portion of the hash table may contain the following entries before the above pseudo code is performed to fill the hash table. For simplicity, network node identifiers are assumed to be integers starting from 1:

1--->PreviousPrimarySlots[0]
0
0
0
2

Therefore, before the FOR LOOP hits the fifth entry, the three empty slots are updated with 1. After the FOR LOOP hits the next primary entry (in this example, 2) the PreviousPrimarySlot is updated and the process is repeated for the subsequent table entries:
1
1
1
1
2--->PreviousPrimarySlots[0]

If there was hash collision, the PreviousPrimarySlots will have more than one entry. The following example shows a portion of the hash table were two collided entries are saved after each other:
1--->PreviousPrimarySlots[0]
2--->Previous PrimarySlots[1]
0
0
0
2

Before the FOR LOOP hits the second 2 (which is not a collided entry), the empty hash table entries are filed with the collided primary entries:
1
2
1
2
1
2--->PreviousPrimarySlots[0]

FIG. 6 shows the hash table of FIG. 4 after the rest of the hash table is filled. As shown, all hash buckets 415 are filled with node IDs. Each of the slots that were empty after assigning of the primary entries is assigned to one of the two nodes.

FIG. 7 illustrates another example for generating primary entries for a hash table 705 in some embodiments of the invention when the number of nodes is 3 and the number of seeds is also 3. Assuming that the modulo values using the three seeds for the third node are calculated as 2, 10, and 13, FIG. 7 shows that the node ID of the third node is written in the hash table entries 705-715 that correspond to the calculated modulo values.

FIG. 8 shows the hash table in the example of FIG. 7 after the rest of the hash buckets are filled with the node IDs. A comparison of hash table 805 in FIG. 8 and the hash table 405 in FIG. 6 shows that some of the hash buckets 830 that were assigned to nodes 1 and 2 in FIG. 6 are assigned to node 3 in FIG. 8. However, the rest of the nodes are assigned to the same nodes in both tables. In other words, the hash buckets that are not assigned to the new node are assigned to the same nodes. In this way, the consistent hashing technique speeds up traffic dispatching after a scaling event by guaranteeing that packets 240 that are assigned to old nodes can be dispatched to the nodes identified by hash table 235 (as described above by reference to FIG. 2C).

Once a hash table is created for the current number of nodes, the hash table is used to consistently forward the packets to different nodes. For each incoming packet, the hash of the n tuple in the packet is calculated. Modulo of the calculated value and the size of the hash table is then used as an index to the hash table to identify the packet's destination node.

Figure 9:
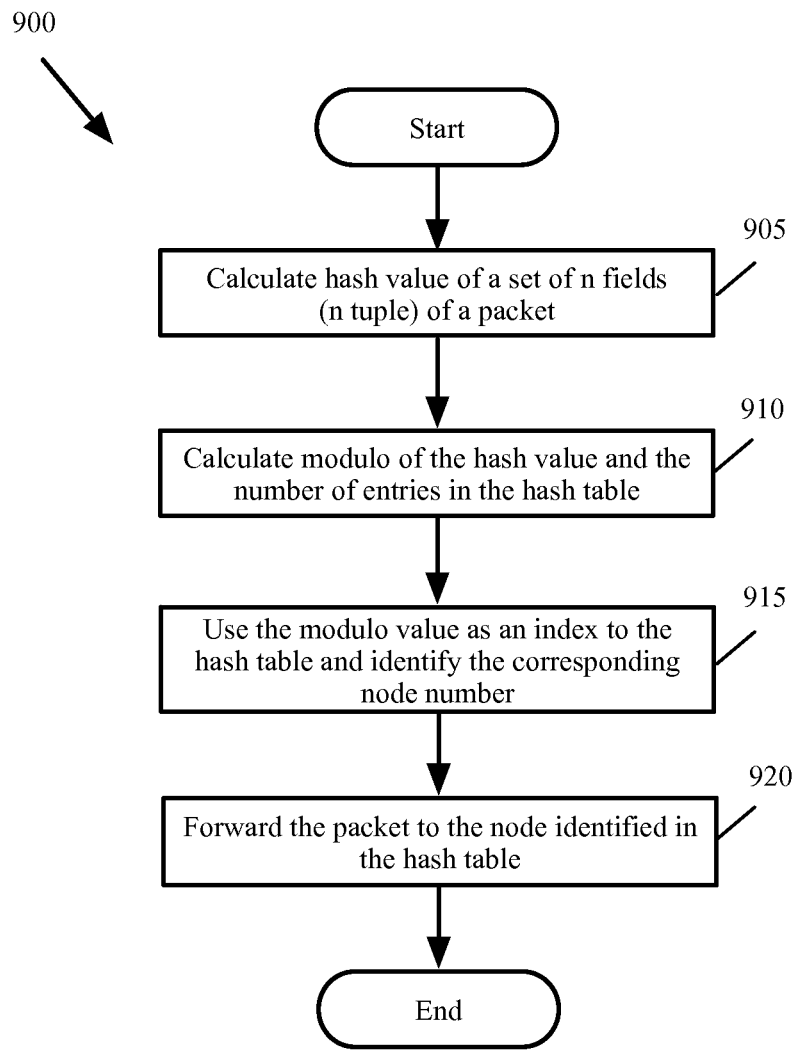
FIG. 9 conceptually illustrates a process that is used to forward packets to target nodes in a network in some embodiments of the invention.

FIG. 9 conceptually illustrates a process 900 that is used to forward incoming packets to destination nodes in a network in some embodiments of the invention. As shown, the process calculates (at 905) hash value of a set of fields in a packet. Some embodiments use a set of n fields (that have n values or an n tuple, where n is an integer value) that uniquely identify a bidirectional connection between two different machines. For instance, some embodiments that utilize a transmission control protocol/Internet protocol (TCP/IP) calculate the hash of a 5 tuple that is made up of source IP address, destination IP address, source port number, destination port number, and the protocol in use. The n tuple in some embodiments is selected such that packets that belong to the same session would have the same n tuple values (e.g., the values that identify the sender, the receiver, and the protocol used between the sender and the receiver and are the same for all packets of the same session).

The hash calculation of this n tuple in some embodiments results in a single large number. For instance, some embodiments that use MD5 to hash the n tuple value of the packets, generate a 128-bit hash value. In order to use this value as an index to the hash table, modulo of the hash value and the number of entries (i.e., number of hash buckets) in the hash table is calculated. As shown in FIG. 9, the process calculates (at 910) modulo of the hash value and the number of entries (i.e., number of hash buckets) in the hash table. For instance, if the hash table has m buckets, modulo calculation involves determining the remainder of dividing the hash value by m (which results in an integer value between 0 and m−1).

Figure 10:
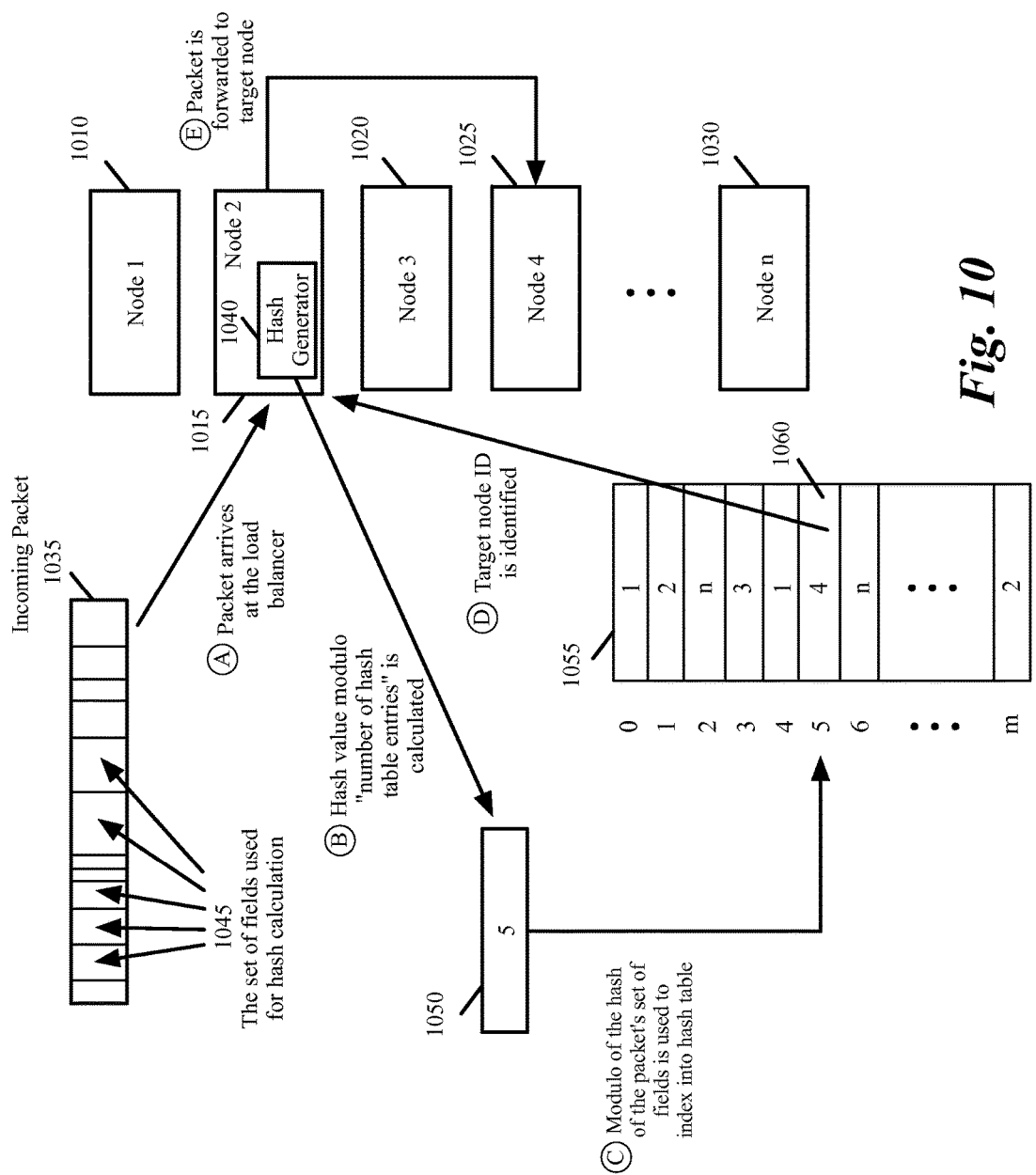
FIG. 10 conceptually illustrates forwarding an incoming packet to a target node in some embodiments of the invention.

FIG. 10 conceptually illustrates forwarding an incoming packet to a destination node in some embodiments of the invention. The network includes several nodes 1010-1030. In this example, one of the nodes 1015 is acting as a load balancer that dispatches the packets to their destinations. The forwarding of the packet is conceptually shown in several steps A-E.

As shown, in step A, a packet 1035 arrives at the load balancer 1015. The load balancer 1015 includes a hash generator function 1040. The hash generator function 1040 generates a hash value for a set of fields 1045 of the incoming packets. In step B, the hash value modulo number of hash table entries is calculated.

Referring back to FIG. 9, the process uses the modulo value as an index to the hash table to identify (at 915) the node number in the corresponding hash bucket. The process then sends (at 920) the packet to the node identified in the hash table. The process then ends. As shown in step C in FIG. 10, the module value 1050 (in this example 5) is used as an index into the hash table 1055. The node ID (in this example 4) in the corresponding hash bucket 1060 is identified in step D. The load balancer 1015 then forwards the packet 1035 to node 4 1025 in step E.

II. Observation Period

When a node is added or removed from the network, the number of nodes in the hash table has to be updated. Prior to adding or removing of a node, the packets are "observed" for a configurable or predetermined period of time (e.g., 3 minutes) to identify the ongoing sessions. During the observation period, the packets are still dispatched according to the hash table that existed prior to the scaling event.

Figure 11:
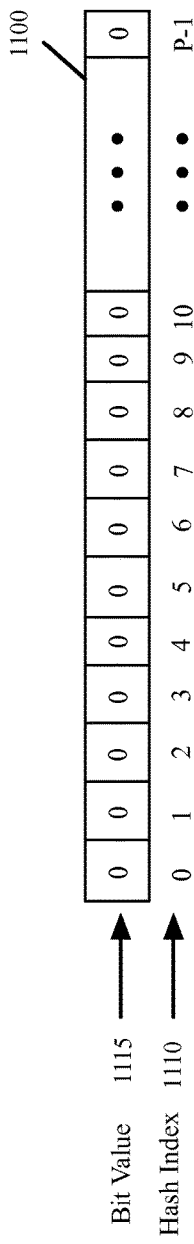
FIG. 11 conceptually illustrates a bit vector table in some embodiments of the invention.

During the observation period, a bit vector table (or Bloom filter) is generated. FIG. 11 conceptually illustrates a bit vector table 1100 in some embodiments of the invention. The table includes a set of bits 1115. Each bit value corresponds to a hash index, which starts at 0 and is increased by 1 for each bit vector table entry. The size of the bit vector table in the example of FIG. 11 is P. The size of the bit vector table has to be much higher (e.g., 5 times, 10 times, 100 times, etc., larger) than the number of expected sessions. Otherwise, there will be a high false positive percentage that will have to be further examined by a computationally intensive connection tracking algorithm.

As shown in FIG. 11, the bit values are initially set to '0' (or false). In order to fill the bit vector table during observation period, K hash functions are used. The Bloom filter hash functions are selected such that they generate hash values with a uniform random distribution. For instance, some embodiments utilize a fast hash function such as the cyclic redundancy check function CRC16 to fill the bit vector table. Each hash function maps (or hashes) the n tuple of a packet to one of the p bit vector positions. Each n tuple of an incoming packet is hashed by using each one of the hash functions. Modulo of the hash values and the size of the bit vector table are calculated. The modulo value is used as an index to the bit vector table and the corresponding bit in the bit vector table is set to '1' (or true).

As described further below, the n tuple of the incoming packets are hashed during a re-dispatching period by using the same K hash functions. The modulo of the hash values and the size of the bit vector table are calculated. The modulo values are used as index into the bit vector table. When any of the modulo values of a packet corresponds to a bit vector table entry of '0', the packet does not belong to a session that was ongoing during the observation period. On the other hand, when all modulo values of a packet correspond to bit vector entries that are '1', the packet may (not must) belong to a session that existed during the observation period and needs to be further examined by a connection tracking algorithm to deterministically determine whether the packet indeed belongs to an existing session.

Figure 12:
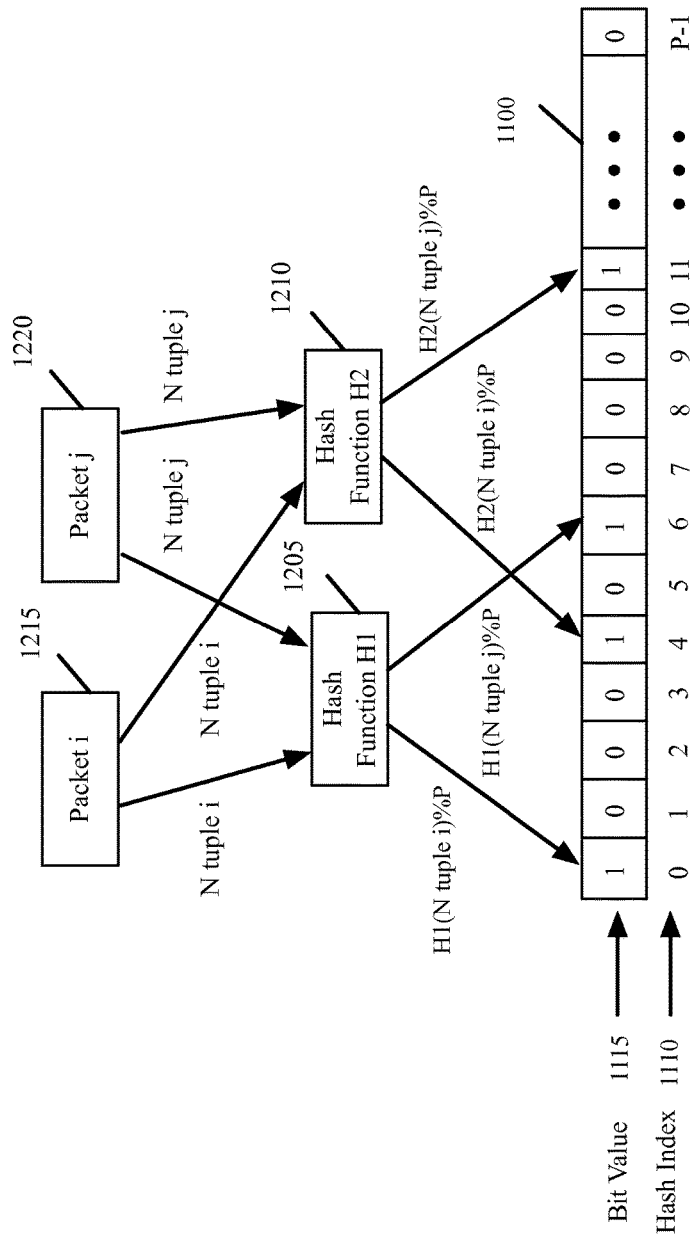
FIG. 12 shows an example of the bit vector after the end of the observation period.

FIG. 12 shows a portion of the bit vector 1100 of FIG. 11 after the end of the observation period. In the example of FIG. 12, two hash function 1205 and 1210 are used to fill up the bit vector map 1100. The example also shows two incoming packets 1215 and 1220. The hash of the n tuple of each packet is calculated by using each of the hash functions 1205-1210.

As shown, the bit values corresponding to hash indexes 0, 4, 6, and 11 are set. In this example, any packet for which the modulo of all hash values results in 0, 4, 6, and 11 has to be further examined during a re-dispatching period to determine whether the packet belongs to a session that was ongoing during the observation period. On the other hand, each packet for which at least one of the modulo values corresponds to a bit vector table entry of '0' definitely does not belong to a session that was ongoing during the observation period.

Figure 13:
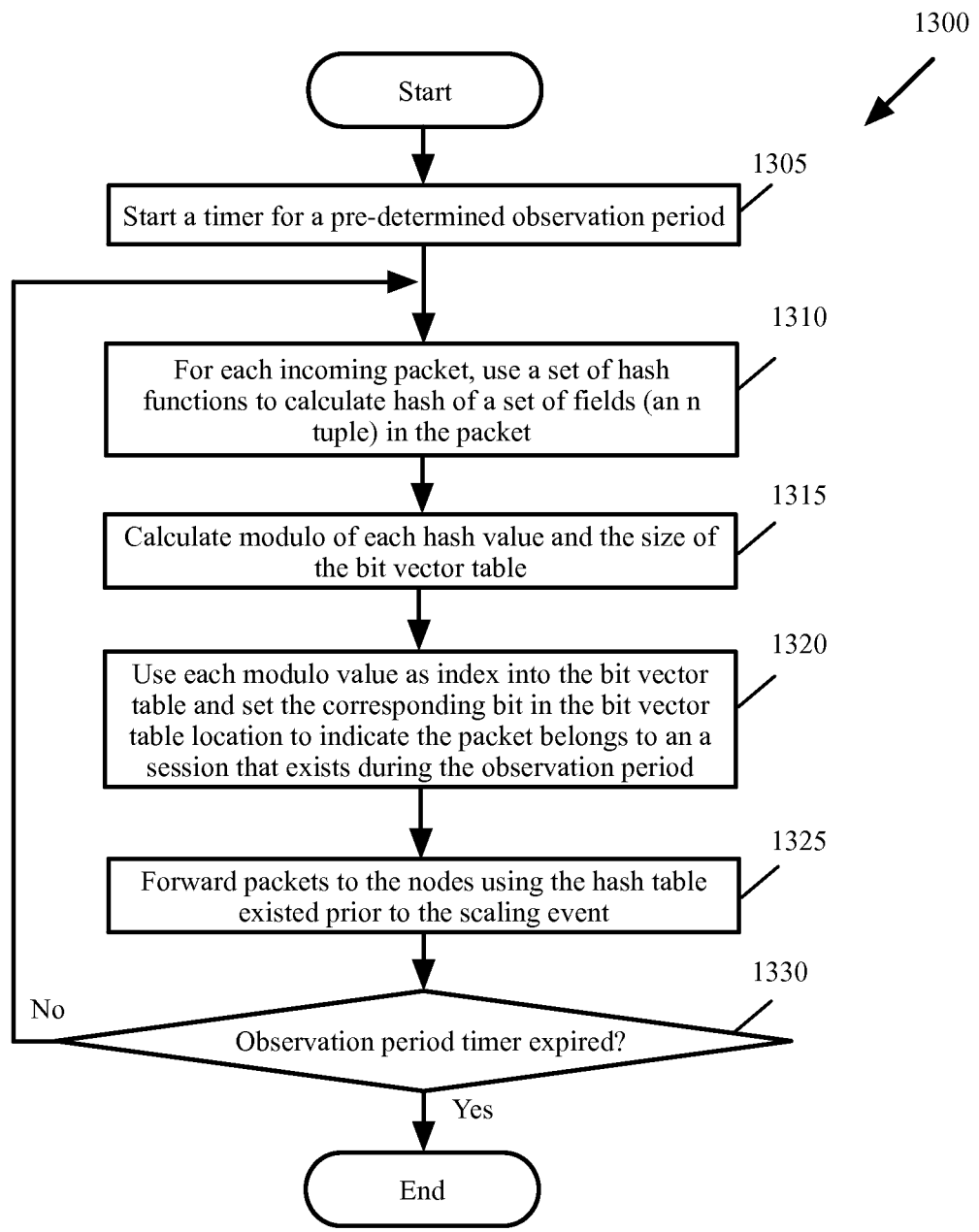
FIG. 13 conceptually illustrates a process for identifying ongoing sessions and dispatching packets during the observation period before scaling the network in some embodiments of the invention.

FIG. 13 conceptually illustrates a process 1300 for identifying ongoing sessions and dispatching packets during the observation period before scaling the network in some embodiments of the invention. As shown, the process starts (at 1305) a timer for a configurable and/or pre-determined observation period. The process uses a group of hash functions to set the bit positions of the bit vector table with a uniform random distribution. The process calculates (at 1310) hash of the set of the fields (the n tuple) in the packet. The process then calculates (at 1315) modulo of each hash value and the size of the bit vector table.

Next, the process uses each modulo value as an index to the bit vector table and sets (at 1320) a bit in the bit vector table location that corresponds to the modulo value produced by the hash functions. Setting the bits indicates that any packet that generates the same modulo values during the re-dispatch period may (not must) belong to the same session as the current packet and has to be further examined by the connection tracking algorithm.

The process then forwards (at 1325) the packets to destination nodes using the hash table that existed prior to the scaling event. In other words, during the observation period, the process still forwards the packets to the destination nodes according to the hash table that existed before the scaling event. The process then determines (at 1330) whether the observation period is over. If not, the process proceeds to 1310, which was described above. Otherwise, the process ends.

III. Re-Dispatching

The re-dispatching period provides a transition period for the scaling event to ensure the packets that belong to session that existed prior to the scaling event are sent to the same nodes that received the other packets of the session in order to provide traffic stickiness. When the scaling event is adding a new node, the re-dispatching period ensures that all packets for the existing sessions are still sent to the same nodes until the sessions are over. When the scaling event is removing of a node, the re-dispatching period ensures that packets for new sessions are not assigned to the node that is going to be removed. The re-dispatching period also ensures that all sessions being processed by this node are over before the node is removed.

In addition, the re-dispatching period minimizes the resources (storage and/or processing resources) that are required for providing traffic stickiness by minimizing the number packets that are processed by the Bloom filter. The re-dispatching period further minimizes the required resources by minimizing the number of packets that Bloom filter identifies as the packets that may belong to an old sessions. These packets are processing by the most resource consuming connection tracking algorithm.

A. Re-Dispatching after Adding a New Node

After the end of the observation period, a configurable and/or predetermined re-dispatching period is started. During this period, a new hash table is created that assigns a set of hash buckets to the new node. However, the packets that belong to sessions that were ongoing during the observation period are forwarded to the nodes that had received the other packets of these sessions even when the packets are assigned to the new node according to the new hash table.

Figure 14:
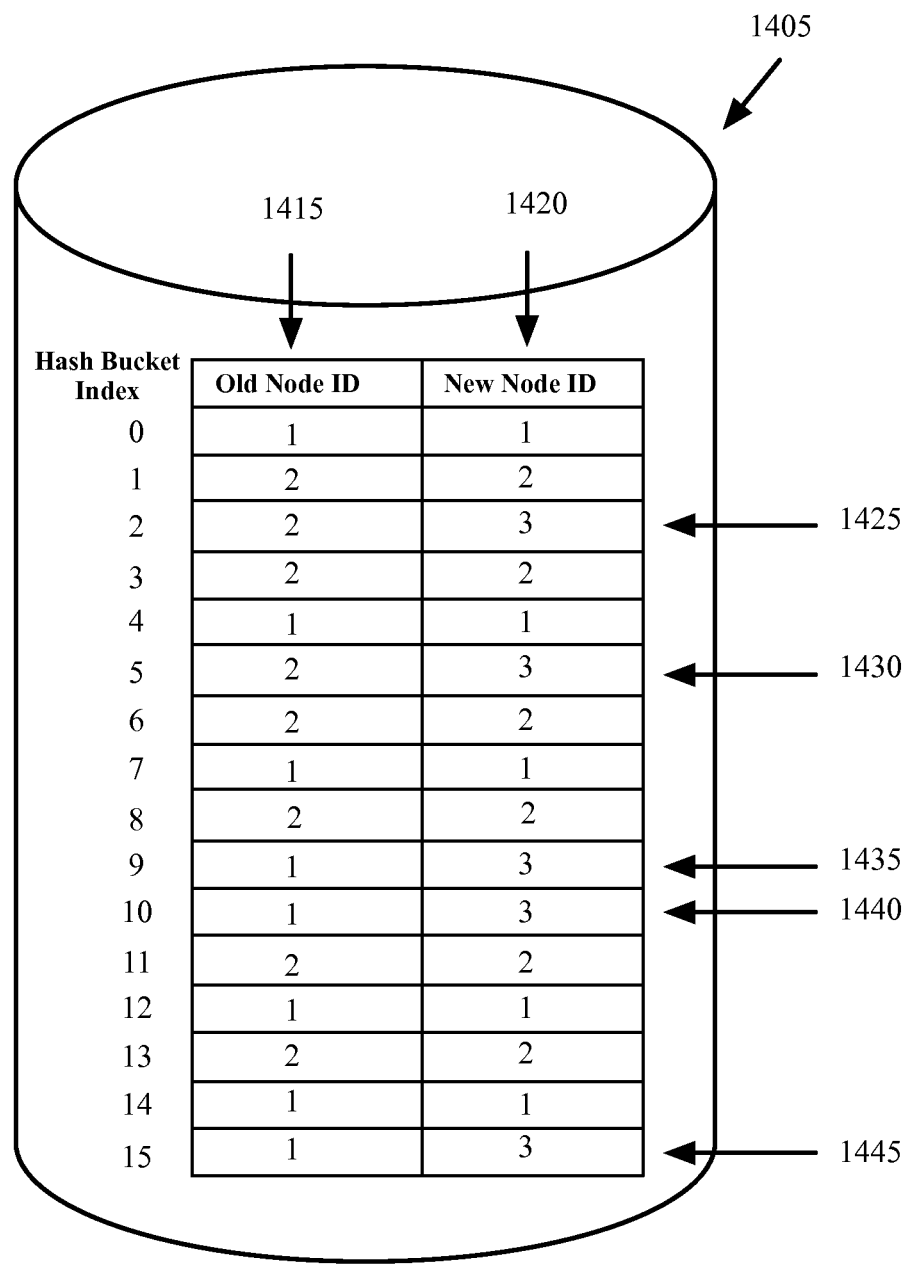
FIG. 14 conceptually illustrates the difference between the hash buckets of a hash table when a third node is added to a network.

FIG. 14 conceptually illustrates the difference between the hash buckets of a hash table when a third node is added to a network. The "old node ID" column 1415 shows the nodes that were assigned to each hash bucket when the network included two nodes. The "new node ID" column 1420 shows the nodes that are assigned to the hash buckets after a third node is added. As shown the hash buckets 1425-1445 that correspond to hash bucket indexes 2, 5, 9, 10, and 15 were previously assigned to one of the existing two nodes but are going to be assigned to the new node after the new node is added to the network at the end of the observation period.

As described further below, packets that are assigned to nodes in hash buckets 1425-1445 after the new node is added need to be further examined to determine whether the packets belong to a session that existed prior to adding of the new node. These packets will be forwarded to the destination nodes based on the "old node ID" 1415. Packets that are assigned to the nodes in hash buckets 1425-1445 and belong to sessions that started after the new node is added are forwarded to the new node. Packets that are assigned to nodes in any hash bucket other than 1425-1445 are sent to the assigned node without further examination.

Figure 15:
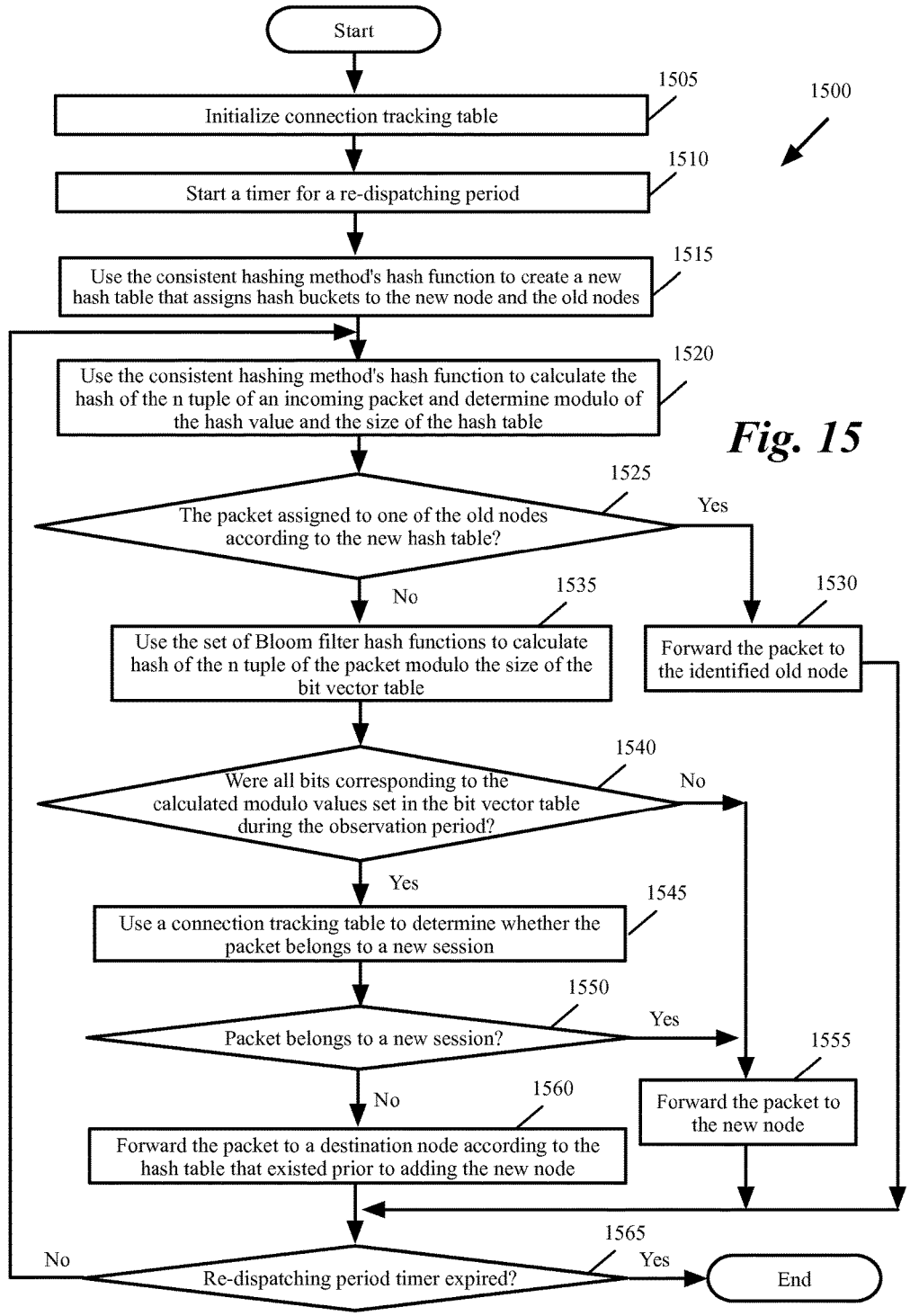
FIG. 15 conceptually illustrates a process for forwarding packets to target nodes during a re-dispatching period in some embodiments of the invention.

FIG. 15 conceptually illustrates a process 1500 for forwarding packets to destination nodes during the re-dispatching period when a new node is added to the network in some embodiments of the invention. As shown, the process initializes (at 1505) the connection tracking table. The connection tracking table is used to identify the sessions that have started during the re-dispatching period. For instance, some embodiments examine a field in a packet to determine whether the packet belongs to a new session. The n tuples of a packet that belongs to a new session is stored in the connection tracking table to identify the session as a session that is started during the re-dispatching period (and therefore is not an "old" session that existed prior to the re-dispatching period). Any future packets that arrive during the re-dispatching period and has the same n tuple, is dispatched to the new node since the packet does not belong an old session.

The process then starts (at 1510) a timer for the re-dispatching period. The process then creates (at 1515) a new hash table that assigns hash buckets to the new node as well as the old node. The process then calculates (at 1520) the hash of the n tuple of an incoming packet. The process uses the same hash function that was used to generate the hash table.

Next, the process determines (at 1525) whether the packet is assigned to one of the old nodes according to the new hash table. If yes, the process forwards (at 1530) the packet to the identified old node. The process then proceeds to 1565, which is described below. Otherwise, the process uses the set of Bloom filter hash functions to calculate (at 1535) the hash of the n tuple of the packet modulo the size of the bit vector table. Since operation 1535 is performed only on a subset of the incoming traffic that are assigned to the new node, process 1500 does not subject all incoming traffic to the resource consuming Bloom filter calculations.

Next, the process determines (at 1540) whether all bits corresponding to the calculated modulo values were set in the bit vector table during the observation period. If not, the packet does not belong to a session that existed during the observation period. The process, therefore, forwards (at 1555) the packet to the new node. The process then proceeds to 1565, which is described below. Otherwise, the packet may (but not must) belong to a session that started prior to the adding of the new node and has to be examiner by using the connection tracking table.

The process uses (at 1545) a connection tracking table to determine whether the packet belongs to a new session. Since operation 1245 is performed only on a first subset of traffic that (i) are assigned to the new node (see operations 1535 and 1530) and (ii) the first subset is further narrowed down to a second subset that are identified by Bloom filter as possibly belonging to old sessions (see operations 1540 and 1545), process 1500 does not subject all incoming traffic to the resource consuming connection tracking operation. Only a fraction of the incoming traffic is subject to connection tracking operations. Details of the use of the connection tracking are described further below by reference to FIG. 16.

Next, the process determines (at 1550), based on the data in connection tracking table, whether the packet belongs to a new session. If yes, the process proceeds to 1555, which was described above. Otherwise, the process forwards (at 1560) the packet to a target node according to the hash table that existed prior to adding of the new node.

Next, the process determines (at 1565) whether re-dispatching period timer is expired. If not, the process proceeds to 1520, which was described above. Otherwise, the process ends.

Figure 16:
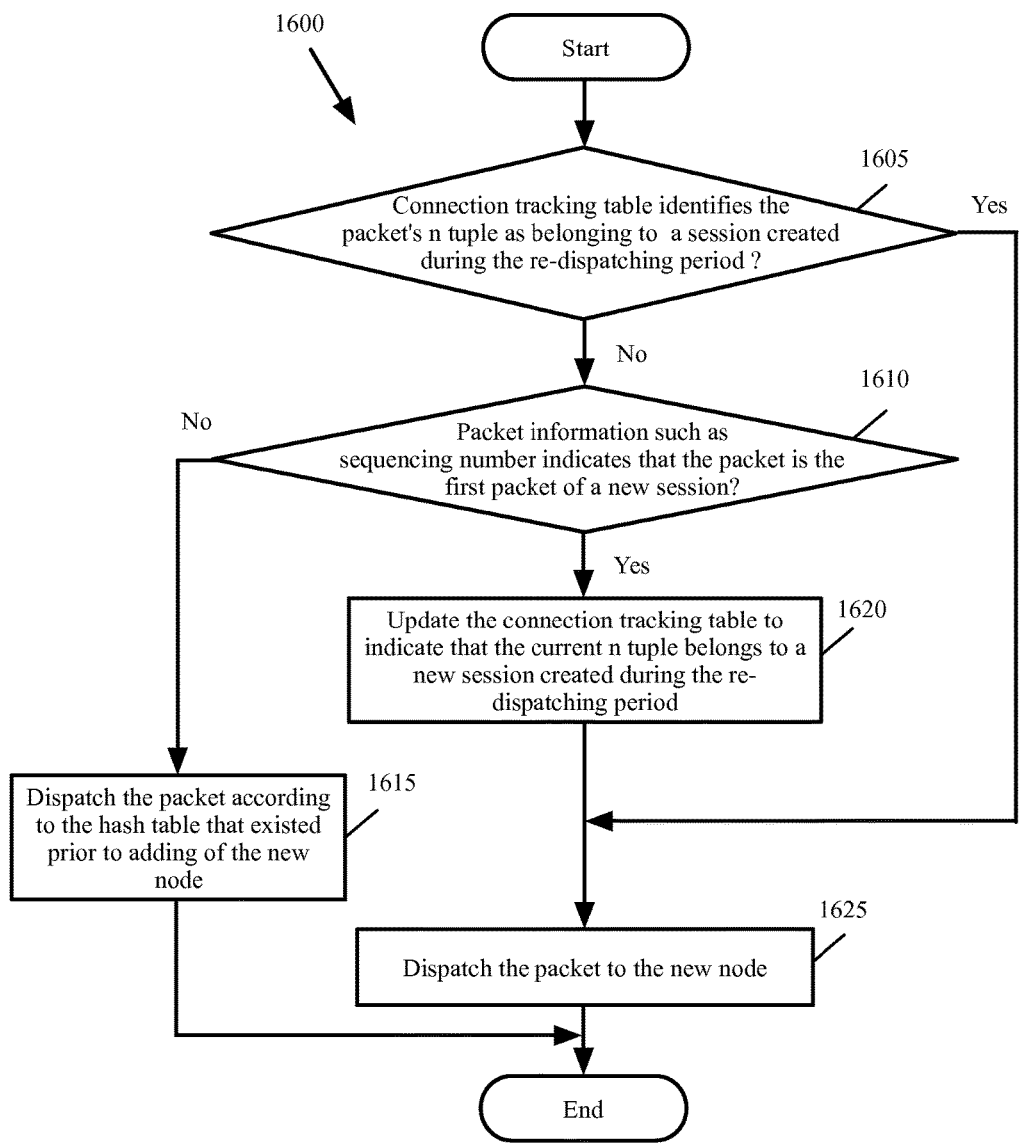
FIG. 16 conceptually illustrates a process for connection tracking in some embodiments of the invention.

FIG. 16 conceptually illustrates a process 1600 for connection tracking in some embodiments of the invention. As shown, the process determines (at 1605) whether connection tracking table identifies the packet's n tuple as belonging to a session that was created during the re-dispatching period. Since the connection tracking table is initialized at the beginning of the re-dispatching period, operation 1605 returns a false value until a packet belonging to a new session is identified as described below.

If the packet belongs to a new session that was created during the re-dispatching period, the process proceeds to 1625, which is described below. Otherwise, the process determines (at 1610) whether the packet information such as sequencing number indicates that the packet is the first packet of a new session. For instance, packets that include an "initial sequence number" (such as TCP-SYN in a TCP/IP protocol) belong to a new session.

If not, the process dispatches (at 1615) the packet according to the hash table that existed prior to adding the new node. The process then ends. Otherwise, when the packet belongs to a session that has just started, the process updates (at 1620) the connection tracking table to indicate that the current n tuple belongs to a new session that is created during the re-dispatching period. The process then forwards (at 1625) the packet to the new node. The process then ends. As described by reference to FIGS. 15 and 16, the described embodiments statefully and deterministically identifies the destination of each packet without having any false positive (i.e., no packets are dispatched to the wrong destination and/or not packets belonging to existing sessions are dispatched to a node that was not processing the previous packets of the same session).

Figure 17:
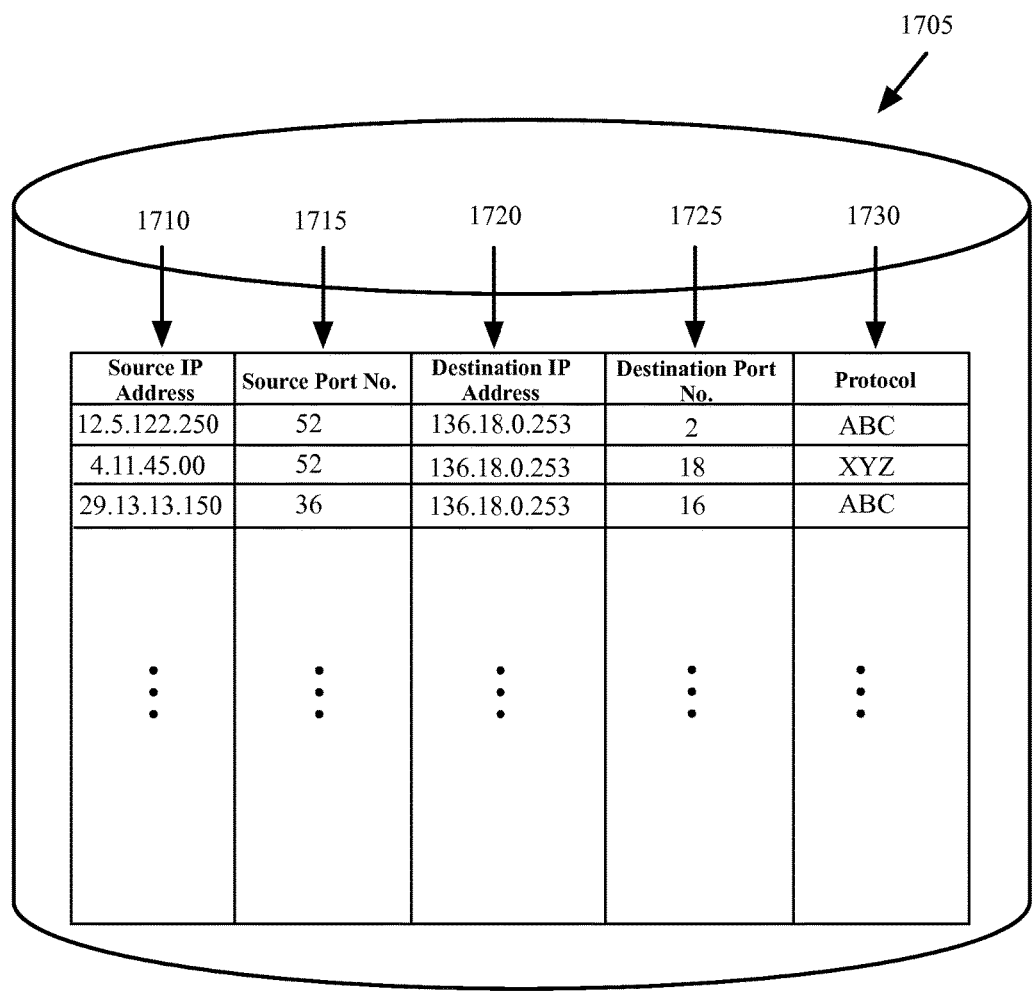
FIG. 17 conceptually illustrates a connection tracking table in some embodiments of the invention.

FIG. 17 conceptually illustrates a connection tracking table 1705 in some embodiments of the invention. As shown, when process 1600 determines that a packet belongs to a new session (e.g., when the packet include an initial sequence number), the process stores the n tuple of the packet that identifies the connection between the source and destination machines (and therefore identifies the session between them) in the connection tracking table.

The information in the connection tracking table is then used in operation 1605 to determine whether any other packets that are received during the re-dispatching period belongs to a session that started during the re-dispatching period. Packets that belong these sessions can be dispatched to the new node without violating traffic stickiness (they do not belong to the old sessions that require to be dispatched to the old nodes).

In the example of FIG. 17, the n tuple includes the source IP address 1710, the source port number 1715, the destination IP address 1720, destination port number 1725, and protocol in use between the source and destination machines 1730. More entries are added to the connection tracking table as more sessions start during the re-dispatching period.

Figure 18:
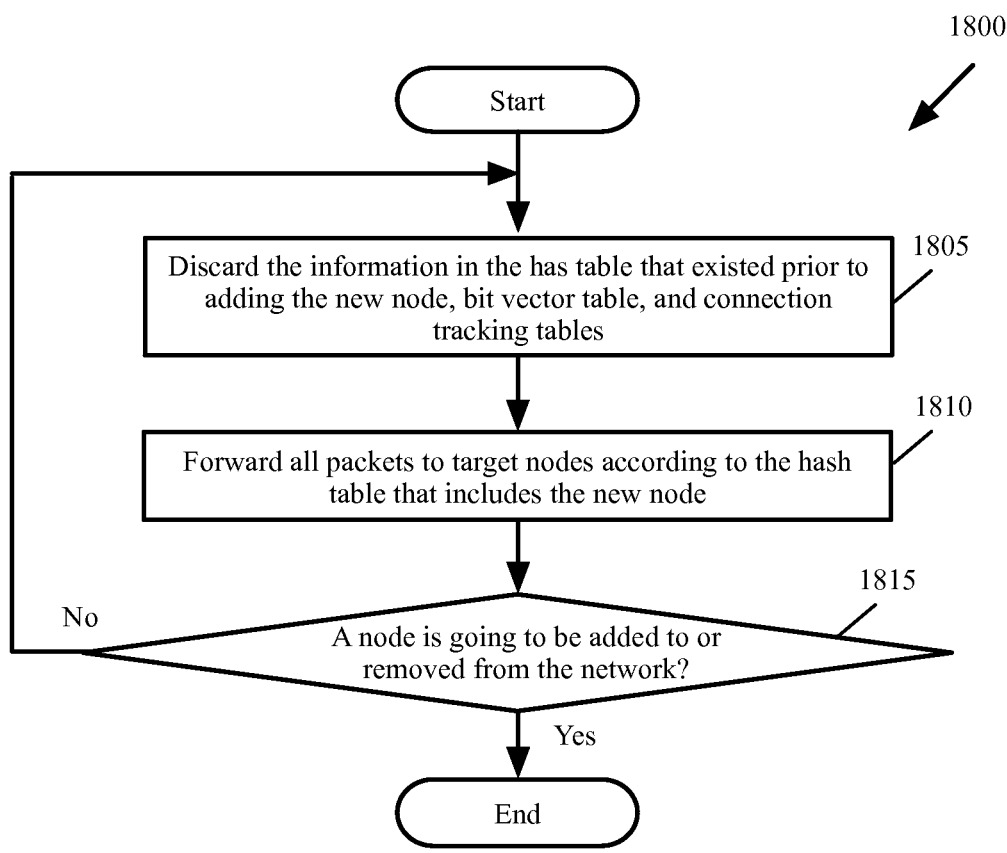
FIG. 18 conceptually illustrates a process that is used to dispatch packets after the end of the re-dispatching period in some embodiments of the invention.

FIG. 18 conceptually illustrates a process 1800 that is used to dispatch packets after the end of the re-dispatching period in some embodiments of the invention. As shown, the process discards (at 1800) the hash table that existed prior to adding of the new node, information in the bit vector table, and the connection tracking table. The process then forwards (at 1810) all packets to target nodes according to the hash table that includes the new node. The process then determines (at 1815) whether a node is added to or removed from the network. If not, the process proceeds to 1805, which was described above. Process 1800 is used for dispatching the packets until another node is going to be added or removed from the network. When a new node is going to be added or a node is going to be removed from the network, process 1800 ends and a new observation period starts.

B. Re-Dispatching after Graceful Removal of a Node

Figure 19:
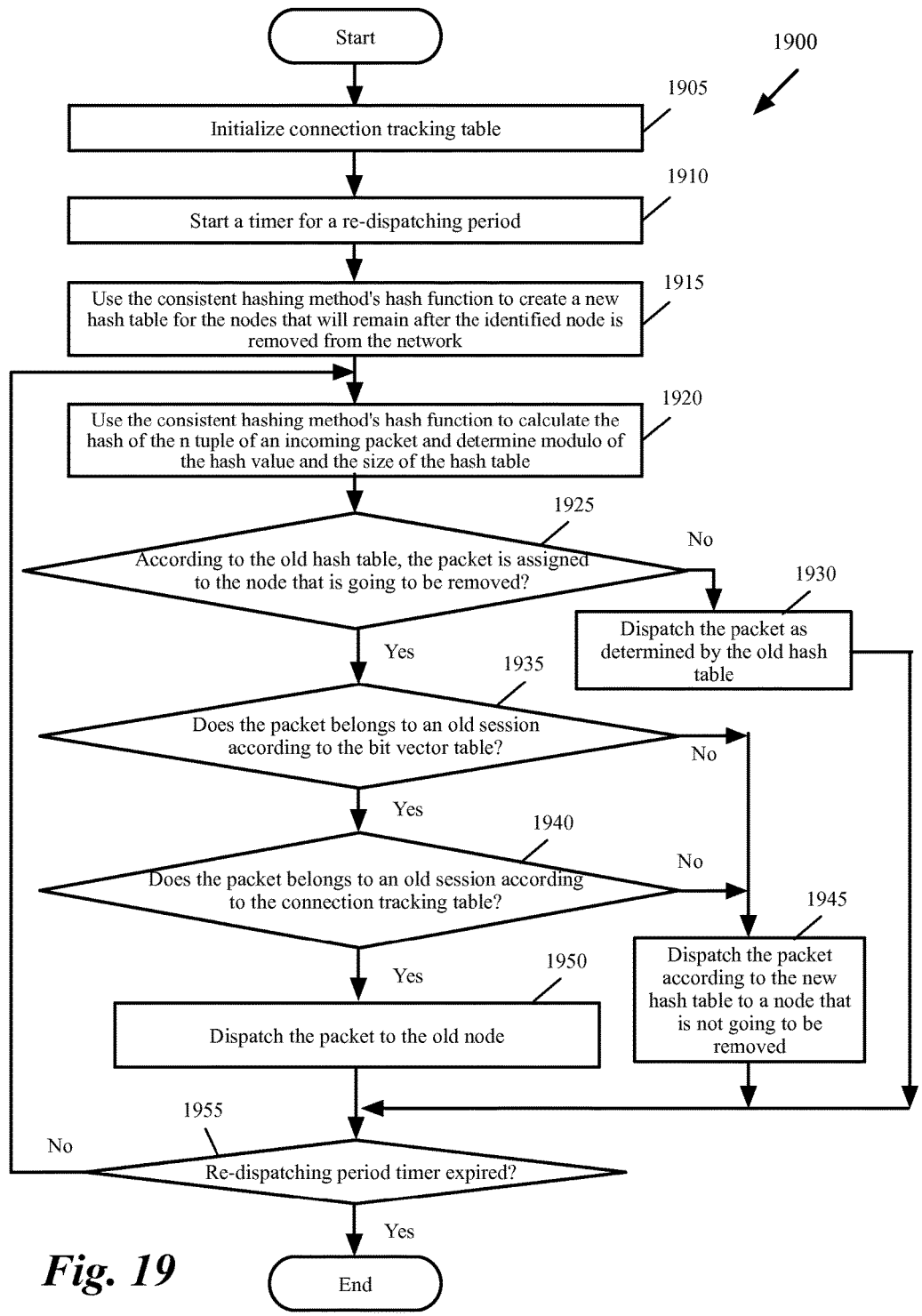
FIG. 19 conceptually illustrates a process for dispatching the incoming packets during the graceful removal of a node from a network in some embodiments of the invention.

FIG. 19 conceptually illustrates a process 1900 for dispatching the incoming packets during the graceful removal of a node from a network in some embodiments of the invention. As shown, the process initializes (at 1905) the connection tracking table. The connection tracking is performed as described by reference to FIGS. 16-17, above. The process then starts (at 1910) a timer for a configurable and/or pre-determined re-dispatching period.

The process then uses the consistent hashing method's hash function to create (at 1915) a new hash table for the nodes that will remain after the identified node is removed from the network. For instance, if the hash table shown in FIG. 8 was used prior to removing of node 3, then process 1900 creates hash table shown in FIG. 6 that does not include node 3.

The process then uses the consistent hashing method's hash function to calculate (at 1920) the hash of the n tuple of an incoming packet and determines modulo of the hash value and the size of the hash table. The process then determines (at 1925) whether according to the old hash table, the packet is assigned to the node that is going to be removed. If not, the process dispatches (at 1930) the packet according to the old hash table. The process then proceeds to 1955, which id described below.

Otherwise, the process determines (at 1935) whether the packet belongs to an old session according to the bit vector table. If not, the process dispatches (at 1945) the packet according to the new hash table to a node that is not going to be removed. By doing this, the process ensures that no new sessions are assigned to the node that is being removed. The process then proceeds to 1955, which is described below.

Otherwise, the process determines (at 1940) whether the packet belongs to an old session according to the connection tracking method (e.g., by checking whether or not the packet belongs to a new session or an ongoing session that started during re-dispatching period as described above by reference to FIGS. 16-17). If the packet does not belong to an old session, the process proceeds to 1945, which was described above. Otherwise, the packet belongs to an old session. The process dispatches (at 1950) the packet to the old node. The process then determines (at 1955) whether the re-dispatching period is over. If not, the process proceeds to 1920, which was described above. Otherwise, the process ends. After the end of the re-dispatching period, the identified node is removed from the network and the old hash table, the bit vector table, and the connection tracking table are discard. The incoming packet traffic is dispatched to the remaining nodes according to the new hash table.

To summarize the benefits of the disclosed techniques, the cost (processing and storage) increases as the traffic dispatching moves from the hashing forwarding, to the Bloom filter bit testing, and finally to the stateful connection creating for exact n-tuple matching and session aging. At the same time, the amount of packets/session passing to next level of handling decreases.

To elaborate the scaling rate of traffic moved to each level of traffic dispatching, assume that there is N nodes in the network. During the normal operation time, all traffic is handled by the according to the consistent hashing method described above in section I. This operation can be offloaded to hardware. When one extra node is added to the network, there is roughly 1/(N+1) packets/sessions that are moved from the old nodes to the new node according to the hashing algorithm. The traffic pipe for hashing forwarding is therefore N/(N+1) and the Bloom filter has to process 1/(N+1) of total packets/sessions. If with reasonable size of Bloom filter bit vector table a 1% of false-positive bit-testing rate is achieved, the traffic handled by stateful connection tracking is just [1%*1/(N+1)] of the total traffic.

The software data-path (the Bloom filter and stateful connection tracking) only needs the capacity and performance to handle the capacity and performance of one node that provides the service, and the connection tracking only needs to handle a small fraction of that number. By using the disclosed consistent hashing algorithm, dispatching of traffic to multiple nodes is supported. At the same time, same flow/session is sticking to same node. No matter how many connections are supported in the system, the size of consistent hashing table is fixed. The packet forwarding part of the algorithm can be easily offloaded to hardware (such as to a switching chip set) and the software only needs to maintain the hashing table.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
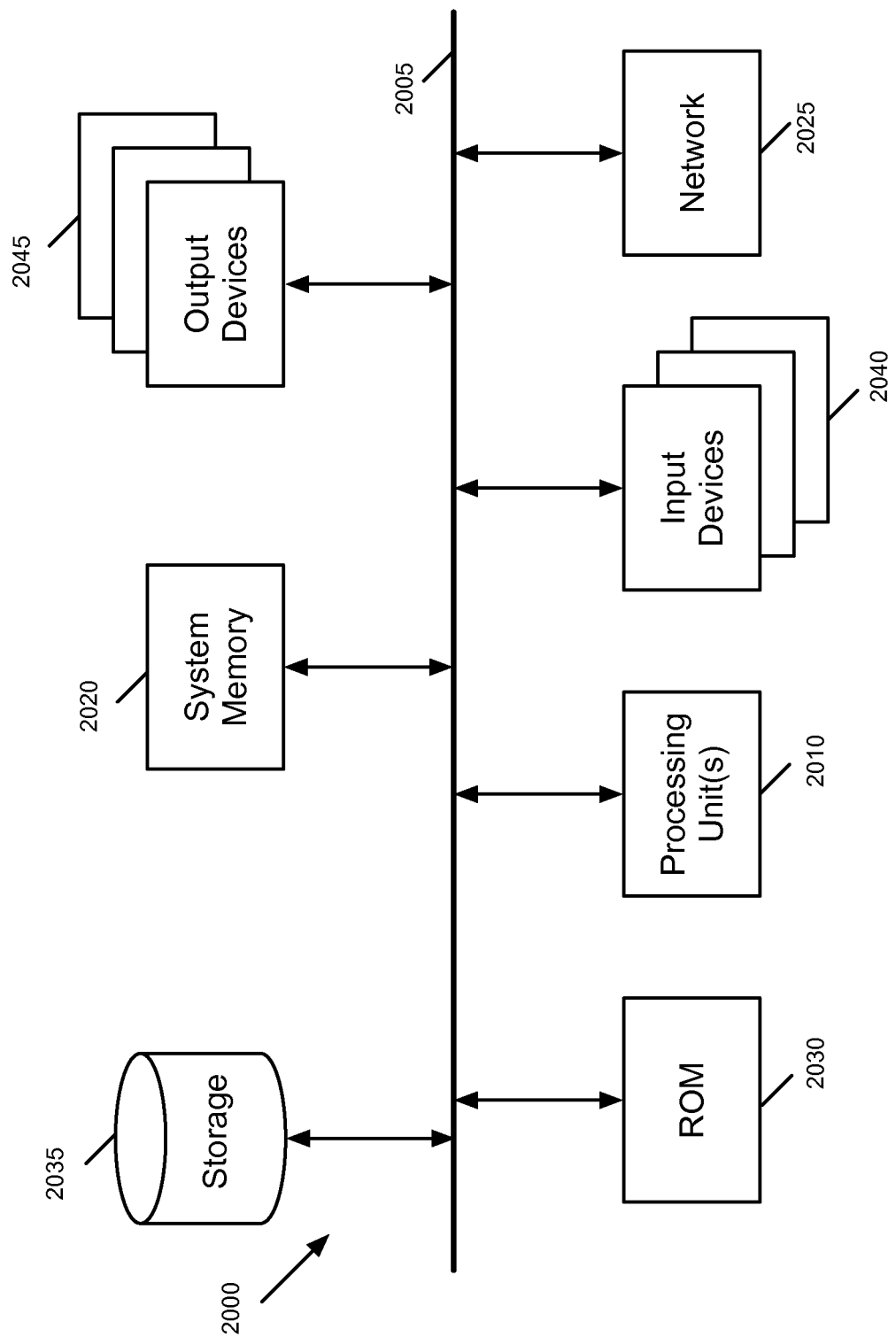
FIG. 20 conceptually illustrates an electronic system with which some embodiments of the invention are implemented.

FIG. 20 conceptually illustrates an electronic system 2000 with which some embodiments of the invention are implemented. The electronic system 2000 can be used to execute any of the control, virtualization, or operating system applications described above. The electronic system 2000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieve instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieve instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 1, 3, 5, 9, 13, 15-16, and 18-19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

We claim:

1. A method of adding a new node to a network, the method comprising:

identifying a set of communication sessions by calculating a hash value for a set of fields of each incoming packet during a first period of time;

identifying a first set of packets for sending to the new node by calculating a hash value for the set of fields of each incoming packet during a second period of time;

identifying a second set of packets in the first set of packets that are candidates to belong to the identified set of sessions by calculating a plurality of hash values for the set of fields of each packet in the first set of packets;

determining whether the packets in the second set belong to the identified set of communication sessions using a connection tracking table;

sending the packets in the second set that are determined as not belonging to the identified set of sessions to the new node; and sending the packets in the second set that are determined as belonging to the identified set of sessions to a network node other than the new node.

2. The method of claim 1, wherein the set of fields in each packet identifies a source and a destination of the packet.

3. The method of claim 1, wherein the network comprises a first set of nodes prior to adding the new node, the method further comprising:
defining a hash table comprising a plurality of entries;
assigning each node in the first set of nodes to one or more entries of the hash table based on a hash of an identification of each node in the first set of nodes.

4. The method of claim 3, the method further comprising:
prior to adding the new node to the network, calculating a hash value for the set of fields of each incoming packet;
identifying a node in the hash table based on the calculated hash value; and
sending the incoming packet to the identified node.

5. The method of claim 3, wherein sending a packet in the second set that is determined as belonging to the identified set of sessions to a network node other than the new node comprises:
calculating a hash value for the set of fields of the packet;
identifying a node in the hash table based on the calculated hash value; and
sending the packet to the identified node.

6. The method of claim 3, wherein the hash table is a first hash table, the method further comprising:
defining a second hash table comprising a same number of entries as the first hash table;
assigning the new node to a set of entries of the second hash table based on a hash of an identification of the new node; and
assigning each entry of the second hash table that is not assigned to the new node to a same node that is assigned to a corresponding entry of the first hash table.

7. The method of claim 6, wherein identifying the first set of packets comprises:
calculating a hash value for the set of fields of an incoming packet;
identifying a node in the second hash table based on the calculated hash value for the incoming packet; and
including the incoming packet in the first set of packets when the new node is identified in the second hash table based on the calculated hash value of the incoming packet.

8. The method of claim 1 further comprising:
initializing entries of a bit vector comprising a plurality of entries to false; and
during the first period of time, using a plurality of hash functions to calculate a plurality of hash values for the set of fields of each incoming packet,
wherein identifying the set of communication sessions comprises setting a plurality of entries in the bit vector to true based on the calculated plurality of hash values of the incoming packets.

9. The method of claim 8, wherein identifying the second set of packets in the first set of packets comprises:
using the plurality of hash functions to calculate a plurality of hash values for the set of fields of each packet in the first set of packets;
identifying a plurality of entries in the bit vector table that correspond to the calculated hash values of each packet in the first set of packets; and
including a packet in the second set of packets when all entries in the bit vector table corresponding to the hash values of the packet are set to true.

10. The method of claim 1, wherein determining whether a particular packet in the second set belongs to the identified set of communication sessions comprises:
determining that a particular set of fields in the particular packet identifies the particular packet as a first packet in a particular communication session; and
storing said particular set of fields of the particular packet to the connection tracking table.

11. The method of claim 10, wherein determining whether the particular packet in the second set belongs to the identified set of communication sessions further comprises:
determining the particular packet does not belong to the identified set of communication sessions when the particular set of fields in the particular packet matches a set of fields of a previous packet stored in the connection tracking table.

12. A non-transitory machine readable medium storing a program for adding a new node to a network, the program executable by a set of processing units, the program comprising sets of instructions for:
identifying a set of communication sessions by calculating a hash value for a set of fields of each incoming packet during a first period of time;
identifying a first set of packets for sending to the new node by calculating a hash value for the set of fields of each incoming packet during a second period of time;
identifying a second set of packets in the first set of packets that are candidates to belong to the identified set of sessions by calculating a plurality of hash values for the set of fields of each packet in the first set of packets;
determining whether the packets in the second set belong to the identified set of communication sessions using a connection tracking table;
sending the packets in the second set that are determined as not belonging to the identified set of sessions to the new node; and
sending the packets in the second set that are determined as belonging to the identified set of sessions to a network node other than the new node.

13. The non-transitory machine readable medium of claim 12, wherein the set of fields in each packet identifies a source and a destination of the packet.

14. The non-transitory machine readable medium of claim 12, wherein the network comprises a first set of nodes prior to adding the new node, the program further comprising sets of instructions for:
defining a hash table comprising a plurality of entries;
assigning each node in the first set of nodes to one or more entries of the hash table based on a hash of an identification of each node in the first set of nodes.

15. The non-transitory machine readable medium of claim 14, the program further comprising sets of instructions for:
calculating, prior to adding the new node to the network, a hash value for each set of fields of each incoming packet;
identifying a node in the hash table based on the calculated hash value; and
sending the incoming packet to the identified node.

16. The non-transitory machine readable medium of claim 14, wherein the set of instructions for sending a packet in the second set that is determined as belonging to the identified set of sessions to a network node other than the new node comprises sets of instructions for:

calculating a hash value for the set of fields of the packet;
identifying a node in the hash table based on the calculated hash value; and
sending the packet to the identified node.

17. The non-transitory machine readable medium of claim 14, wherein the hash table is a first hash table, the program further comprising sets of instructions for:
defining a second hash table comprising a same number of entries as the first hash table;
assigning the new node to a set of entries of the second hash table based on a hash of an identification of the new node; and
assigning each entry of the second hash table that is not assigned to the new node to a same node that is assigned to a corresponding entry of the first hash table.

18. The non-transitory machine readable medium of claim 17, wherein the set of instructions for identifying the first set of packets comprises sets of instructions for:
calculating a hash value for the set of fields of an incoming packet;
identifying a node in the second hash table based on the calculated hash value for the incoming packet; and
including the incoming packet in the first set of packets when the new node is identified in the second hash table based on the calculated hash value of the incoming packet.

19. The non-transitory machine readable medium of claim 12, the program further comprising sets of instructions for:
initializing entries of a bit vector comprising a plurality of entries to false; and
using, during the first period of time, a plurality of hash functions to calculate a plurality of hash values for the set of fields of each incoming packet,
wherein identifying the set of communication sessions comprises setting a plurality of entries in the bit vector to true based on the calculated plurality of hash values of the incoming packets.

20. The non-transitory machine readable medium of claim 19, wherein the set of instructions for identifying the second set of packets in the first set of packets comprises sets of instructions for:
using the plurality of hash functions to calculate a plurality of hash values for the set of fields of each packet in the first set of packets;
identifying a plurality of entries in the bit vector table that correspond to the calculated hash values of each packet in the first set of packets; and
including a packet in the second set of packets when all entries in the bit vector table corresponding to the hash values of the packet are set to true.

21. The non-transitory machine readable medium of claim 12, wherein the set of instructions for determining whether a particular packet in the second set belongs to the identified set of communication sessions comprises sets of instructions for:
determining that a particular set of fields in the particular packet identifies the particular packet as a first packet in a particular communication session; and
storing said particular set of fields of the particular packet to the connection tracking table.

22. The non-transitory machine readable medium of claim 21, wherein the set of instructions for determining whether the particular packet in the second set belongs to the identified set of communication sessions further comprises a set of instructions for:
determining the particular packet does not belong to the identified set of communication sessions when the particular set of fields in the particular packet matches a set of fields of a previous packet stored in the connection tracking table.

* * * * *